(12) United States Patent
Kato et al.

(10) Patent No.: US 11,230,271 B2
(45) Date of Patent: Jan. 25, 2022

(54) FOREIGN BODY REMOVAL DEVICE AND DRIVE DEVICE FOR FOREIGN BODY REMOVAL DEVICE

(71) Applicant: KOITO MANUFACTURING CO., LTD., Tokyo (JP)

(72) Inventors: Takayuki Kato, Shizuoka (JP);
Takayoshi Mochizuki, Shizuoka (JP);
Akinobu Kubota, Shizuoka (JP);
Yasuhiro Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 653 days.

(21) Appl. No.: 15/538,935

(22) PCT Filed: Nov. 27, 2015

(86) PCT No.: PCT/JP2015/083415
§ 371 (c)(1),
(2) Date: Jun. 22, 2017

(87) PCT Pub. No.: WO2016/104050
PCT Pub. Date: Jun. 30, 2016

(65) Prior Publication Data
US 2017/0355353 A1 Dec. 14, 2017

(30) Foreign Application Priority Data

Dec. 22, 2014 (JP) .............................. JP2014-258935
Feb. 20, 2015 (JP) .............................. JP2015-032139

(51) Int. Cl.
*B60S 1/60* (2006.01)
*B60S 1/56* (2006.01)
(Continued)

(52) U.S. Cl.
CPC ................ *B60S 1/60* (2013.01); *B60S 1/481* (2013.01); *B60S 1/56* (2013.01); *H04N 5/225* (2013.01); *H04N 7/18* (2013.01); *B60S 1/54* (2013.01)

(58) Field of Classification Search
CPC .......... F16H 19/043; B60S 1/481; B60S 1/54; B60S 1/56; B60S 1/60; B05B 11/00; B05B 11/3087; F04B 35/045; B08B 5/02
(Continued)

(56) References Cited

U.S. PATENT DOCUMENTS 2,192,433 A * 3/1940 Cornelison ........... E01C 23/222
137/624.13
4,315,582 A 2/1982 Micallef
(Continued)

FOREIGN PATENT DOCUMENTS

CN 103043035 A 4/2013
EP 1616762 A2 1/2006
(Continued)

OTHER PUBLICATIONS

Partial Supplementary Search Report issued in European Application No. 15872619.0, dated Aug. 2, 2018 (11 pages).
(Continued)

*Primary Examiner* — Michael D Jennings
*Assistant Examiner* — Makena S Markman
(74) *Attorney, Agent, or Firm* — Osha Bergman Watanabe & Burton LLP

(57) ABSTRACT

Of moving directions of a piston, the direction in which high-pressure air is delivered is a delivery direction, and the direction in the opposite direction from the delivery direction is a force accumulation direction. The piston is moved in the force accumulation direction by the moving mechanism, and moved in the delivery direction by the biasing
(Continued)

force of the biasing spring in response to the release of the moving force exerted by the moving mechanism. The cylinder is provided with: a piston supporting portion that supports the piston; and a connection protrusion that has a delivery path for delivering the high-pressure air to the nozzle. The inner surface of an end of the piston supporting portion in the delivery direction is formed as a closed surface. The delivery path is located further toward the force accumulation direction than the closed surface is.

2 Claims, 16 Drawing Sheets

(51) Int. Cl.
  *B60S 1/54* (2006.01)
  *H04N 7/18* (2006.01)
  *B60S 1/48* (2006.01)
  *H04N 5/225* (2006.01)
(58) Field of Classification Search
  USPC .................................. 15/404, 405; 74/31, 32
  See application file for complete search history.

(56) References Cited

U.S. PATENT DOCUMENTS

| | | | |
|---|---|---|---|
| 4,674,659 A | 6/1987 | Micallef | |
| 5,083,339 A * | 1/1992 | Bristow | B60S 1/10 15/250.002 |
| 2003/0066909 A1 | 4/2003 | Jenkins | |
| 2008/0190988 A1* | 8/2008 | Pedicini | B25C 1/04 227/130 |
| 2011/0245736 A1 | 10/2011 | Foehrenbach | |
| 2012/0266926 A1 | 10/2012 | Kikuta et al. | |
| 2013/0092758 A1 | 4/2013 | Tanaka et al. | |
| 2013/0255023 A1 | 10/2013 | Kikuta et al. | |
| 2014/0248579 A1* | 9/2014 | Edwards | A61C 1/0084 433/89 |
| 2014/0270379 A1 | 9/2014 | Snider | |
| 2017/0028968 A1 | 2/2017 | Kubota et al. | |

FOREIGN PATENT DOCUMENTS

| | | |
|---|---|---|
| EP | 3132984 A1 | 2/2017 |
| JP | S52-111011 A | 9/1977 |
| JP | S54-015505 A | 2/1979 |
| JP | 03102652 A * | 4/1991 |
| JP | H03-102652 A | 4/1991 |
| JP | H07-208368 A | 8/1995 |
| JP | 2001-171491 A | 6/2001 |
| JP | 2004-202145 A | 7/2004 |
| JP | 2005-299478 A | 10/2005 |
| JP | 2006-211443 A | 8/2006 |
| JP | 2008-206374 A | 9/2008 |
| JP | 2009-064675 A | 3/2009 |
| JP | 2012-504987 A | 3/2012 |
| JP | 2013-203229 A | 10/2013 |
| WO | 2002/053422 A1 | 7/2002 |
| WO | 2015/120866 A1 | 8/2015 |
| WO | 2015/159763 A1 | 10/2015 |

OTHER PUBLICATIONS

International Search Report issued in PCT/JP2015/083415 dated Mar. 1, 2016 (7 pages).
Written Opinion of the International Searching Authority issued in PCT/JP2015/083415 dated Mar. 1, 2016 (14 pages).
Extended Search Report issued in European Application No. 15872619.0, dated Oct. 19, 2018 (10 pages).
Office Action issued in Chinese Application No. 201580070235.0, dated Nov. 1, 2018 (21 pages).
Extended European Search Report in counterpart European Application No. 19171396.5 dated Aug. 23, 2019 (7 pages).

* cited by examiner

FOREIGN BODY REMOVAL DEVICE AND DRIVE DEVICE FOR FOREIGN BODY REMOVAL DEVICE

CROSS-REFERENCE TO RELATED APPLICATIONS

The present application claims the benefit of priority to Japanese Patent Application No. 2014-258935, filed on Dec. 22, 2014, and Japanese Patent Application No. 2015-032139, filed on Feb. 20, 2015, the disclosures of which are incorporated herein by reference in their entirety.

BACKGROUND

Technical Field

The present invention relates to a technical field of a foreign matter removal device configured to wash an object to be washed by injecting high-pressure air from a nozzle and a removal drive device configured to drive the foreign matter removal device.

Related Art

Various structures are provided in a structural object such as a vehicle. Of the structures, for example, for an in-vehicle camera, a vehicle lamp and a rearview mirror, it is desirable to remove foreign matters such as moisture, mud and dust so as to ensure favorable visibility. For example, the in-vehicle camera is used as a device for displaying a video on a display so as to check the rear of the vehicle or to check a position on an outside of the vehicle, which is hardly visible to a driver. However, an imaging unit is often contaminated by mud scattered during traveling of the vehicle or water droplets attached thereto during rainy weather traveling or the like, so that the video displayed on the display is blurred, which may cause interruption of the checking.

Thus, for example, there has been known a foreign matters removal device configured to remove foreign matters such as moisture, mud and dust attached to the imaging unit of the in-vehicle camera by injecting high-pressure air from a nozzle to the in-vehicle camera (for example, refer to Japanese Patent Application Publication No. 2001-171491A, referred herein as Patent Document 1).

In the foreign matter removal device disclosed in Patent Document 1, the high-pressure air is injected from a compressed air generation unit towards the imaging unit to blow-off the mud and water droplets, thereby addressing the contamination of the imaging unit.

The foreign matter removal device for addressing the contamination of the imaging unit by the compressed air has a merit in that a liquid storage tank is not required and the injected liquid does not remain on the imaging unit, as compared to a foreign matter removal device for addressing the contamination by injecting high-pressure liquid such as water.

Also, there has been known a vehicle in which a camera is mounted so as for a driver to check the rear of the vehicle and the surrounding situation. For example, a rear camera is mounted so that the driver can check the rear by displaying an image captured by the rear camera on a monitor screen in the vicinity of a driver seat when reversing the vehicle. In this case, it is favorable to remove the foreign matters such as dirt, water droplets and the like attached on an imaging surface of the camera so as to clearly recognize the captured image. To this end, a vehicle having a cleaner (a foreign matter removal device) configured to remove the foreign matters by injecting air or water to the imaging surface has been also suggested.

Japanese Patent Application Publication No. 2006-211443A, referred herein as Patent Document 2, discloses a configuration having a cleaner configured to remove the dirt of a camera lens mounted in a vehicle.

SUMMARY OF THE INVENTION

The foreign matter removal device configured to address the contamination of the imaging unit by the high-pressure air has the above-described merit. However, the high-pressure air generation unit configured to repeatedly generate the high-pressure air and to repeatedly inject the generated high-pressure air is required. Also, an operating noise, which is to be caused due to contacts between respective parts of the high-pressure air generation unit when the respective parts repeatedly perform an operation, may be generated depending on structures of the high-pressure air generation unit.

The operating noise may be recognized as abnormal sound to a user, for example, a driver or a passenger of the vehicle. In this case, the driver or passenger may feel uncomfortable, and the components may be damaged or out of order, depending on degrees of the contacts between the respective parts.

Also, a removal drive device configured to drive a motor of the foreign matter removal device for vehicle is required to execute a process of removing the foreign matters at appropriate timing.

In the meantime, it is preferable to avoid complication of routing of a power supply line, a ground line, a control line and the like in the vehicle.

For example, it is considered to control the removal drive device by an ECU (electronic control unit) or the like of the vehicle, thereby executing the foreign matter removal operation. According to this scheme, it is possible to highly control the foreign matter removal execution timing. In this case, however, a wiring (dedicated line) of a control line from the ECU is required, in addition to the power supply line and the ground line, so that it may be difficult to make the wiring depending on a vehicle type or a camera mounting position and a standby time period at a power feeding state may be prolonged and a malfunction may be thus caused.

In the meantime, when operating the removal drive device only by the power supply line and the ground line, the wiring is easily made but a circuit system of driving the motor simply depending on the power feeding is configured, so that it is not possible to perform complex control.

One or more embodiments of the present invention prevents occurrence of an abnormal sound by avoiding contacts between respective parts.

One or more embodiments of the present invention simplifies a wiring configuration and to enable an appropriate foreign matter removal driving.

A foreign matter removal device of the present invention includes a cylinder in which air is introduced, a piston movably supported to the cylinder and configured to deliver the air introduced into the cylinder as high-pressure air, a nozzle configured to inject the high-pressure air delivered by the piston towards an object to be washed, an urging spring configured to urge the piston, and a moving mechanism configured to move the piston to a predetermined position by applying a moving force to the piston, wherein regarding a moving direction of the piston, a direction in which the high-pressure air is to be delivered is a delivery direction and an opposite direction to the delivery direction is a force accumulation direction, wherein the piston is configured to move in the force accumulation direction by the moving mechanism and to move in the delivery direction by an urging force of the urging spring in response to release of the moving force applied by the moving mechanism at the predetermined position, wherein the cylinder is provided with a piston support part configured to movably support the piston and a coupling protrusion having a delivery path, which continues to the piston support part and is configured to deliver the high-pressure air towards the nozzle, wherein an inner surface of an end portion of the piston support part in the delivery direction is formed as a closed surface, and wherein the delivery path is located further towards the force accumulation direction than the closed surface.

With this configuration, when the piston is moved in the delivery direction, compressed air is interposed between the piston and the closed surface of the cylinder.

In the foreign matter removal device, preferably, the moving mechanism includes a main driving gear configured to rotate by a driving force of a motor and a driven gear configured to engage with the main driving gear and to rotate in association with rotation of the main driving gear, and the driving force of the motor is to be transmitted to the piston via the main driving gear and the driven gear.

With this configuration, a reduction mechanism where a large reduction ratio is to be obtained by a simple mechanism having a small number of components is configured by using the main driving gear and the driven gear.

In the foreign matter removal device, preferably, a rack coupled to the piston is provided, the driven gear is provided with a pinion that is to be engaged with the rack, a gear part is provided at a part of an outer periphery of the pinion, and a part of the outer periphery of the pinion where the gear part is not provided is formed as a toothless part.

With this configuration, when the rack is located at the toothless part of the pinion, the piston is moved in the delivery direction by the urging force of the urging spring.

In the foreign matter removal device, a plurality of the gear parts is preferably formed with being spaced in a circumferential direction.

With this configuration, the number of times of injection of the high-pressure air from the nozzle increases during one rotation of the pinion.

In the foreign matter removal device, preferably, a worm is used as the main driving gear and a worm wheel is used as the driven gear.

With this configuration, a reduction mechanism where a large reduction ratio is to be obtained by a simple configuration is configured.

A foreign matter removal device of the present invention includes a cylinder in which air is introduced, a piston movably supported to the cylinder and configured to deliver the air introduced into the cylinder as high-pressure air, a nozzle configured to inject the high-pressure air delivered by the piston towards an object to be washed, an urging spring configured to urge the piston, and a moving mechanism configured to move the piston to a predetermined position by applying a moving force to the piston, wherein regarding a moving direction of the piston, a direction in which the high-pressure air is to be delivered is a delivery direction and an opposite direction to the delivery direction is a force accumulation direction, wherein the piston is configured to move in the force accumulation direction by the moving mechanism and to move in the delivery direction by an urging force of the urging spring in response to release of the moving force applied by the moving mechanism at the predetermined position, and wherein when the piston is moved in the delivery direction, a part of the air in the cylinder is compressed, so that compressed air is generated and is retained at an end portion in the cylinder in the delivery direction.

With this configuration, when the piston is moved in the delivery direction, the compressed air is interposed between the piston and the end portion of the cylinder in the delivery direction.

A removal drive device of the present invention is a removal drive device mounted on a vehicle and configured to drive a foreign matter removal device configured to remove attached foreign matters, and includes a first terminal connected to a power supply line in the vehicle, a second terminal connected to a ground line in the vehicle, a motor driver configured to supply driving current to a motor of the foreign matter removal device and to enable the foreign matter removal device to execute a foreign matter removal operation, and an operation setting unit configured to instruct the motor driver to supply the driving current for a first predetermined time, as a power supply voltage is applied to the first terminal at a state where the second terminal is connected to a ground.

The power supply line and the ground line are connected with the first terminal and the second terminal, so that a minimum wiring configuration is obtained. When a voltage between a power supply voltage and a ground is applied between the first and second terminals, which is a trigger, the operation setting unit sets a foreign matter removal drive time (first predetermined time).

In the removal drive device, the first terminal may be connected to the power supply line to which a power supply voltage is supplied as the vehicle falls within a reverse range.

When the foreign matter removal device sets a rear camera of the vehicle as a target of the foreign matter removal, the foreign matter removal is preferably executed upon operation start of the rear camera. Therefore, when the first terminal is connected to the power supply line to which a power supply voltage is supplied as the vehicle falls within a reverse range, it is possible to start the foreign matter removal operation at appropriate timing.

In the removal drive device, the operation setting unit is preferably configured to control the motor driver not to supply the driving current for a second predetermined time after the power supply voltage is applied to the first terminal at the state where the second terminal is connected to the ground.

Thereby, when a shift lever operation of a driver passes the reverse range or when the power supply voltage is supplied to the first terminal for only a moment by any trigger, a useless foreign matter removal operation is not performed.

In the removal drive device, the second terminal is selectively connected to a predetermined voltage point and the ground, and the operation setting unit controls the motor driver to supply the driving current when the second terminal shifts from a potential of the predetermined voltage point to a ground potential at a state where the power supply voltage is applied to the first terminal.

That is, the operation of the removal drive device can be executed by the control at the ground line-side, too.

The removal drive device may further include a voltage conversion unit configured to generate a driving voltage of the motor by boosting or dropping the power supply voltage that is to be supplied to the first terminal.

The voltage conversion is performed on the assumption that the power supply line connected to the first terminal is not always a power supply line of a specific voltage, depending on a vehicle type or a mounting position. Thereby, it is possible to improve the degree of freedom of wiring.

According to the foreign matter removal device of the present invention, when the piston is moved in the delivery direction, the compressed air is interposed between the piston and the end portion of the cylinder in the delivery direction. Therefore, it is possible to prevent occurrence of an abnormal sound and the like by avoiding contact between the piston and the end portion of the cylinder in the delivery direction.

Also, according to the removal drive device of the present invention, it is possible to execute the foreign matter removal operation for an appropriate time period by the foreign matter removal device with the minimum wiring configuration.

DETAILED DESCRIPTION

Hereinafter, illustrative embodiments for implementing a foreign material removal device of the present invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Meanwhile, in the below, an example where the foreign material removal device of the present invention is applied to a device for removing foreign matters attached to an in-vehicle camera is described. However, the foreign material removal device of the present invention is not limited to the device for removing foreign matters attached to the in-vehicle camera. For example, the foreign matter removal device of the present invention is widely applicable as a device for removing foreign matters attached to various structures, in particular, as a foreign matter removal device for removing foreign matters attached to a structure provided in a vehicle, such as a vehicle lamp, a window, a mirror and a collision prevention sensor.

The foreign matter removal device to be described later includes a cylinder, a piston and a nozzle, and is configured to inject high-pressure air from the nozzle as the piston is moved relative to the cylinder.

In below descriptions, a front and rear direction, an upper and lower direction and a right and left direction are described by using a moving direction of the piston as a front and rear direction. Meanwhile, the front and rear direction, the upper and lower direction and the right and left direction to be described later are provided only for convenience of explanations. The illustrative embodiments of present invention are not limited to these directions.

<Configuration of Foreign Matter Removal Device>

A foreign matter removal device 1 has a function of washing an in-vehicle camera 100 for checking the rear of a vehicle, for example, and is mounted to a rear end-side of a vehicle body (not shown).

Figure 1:
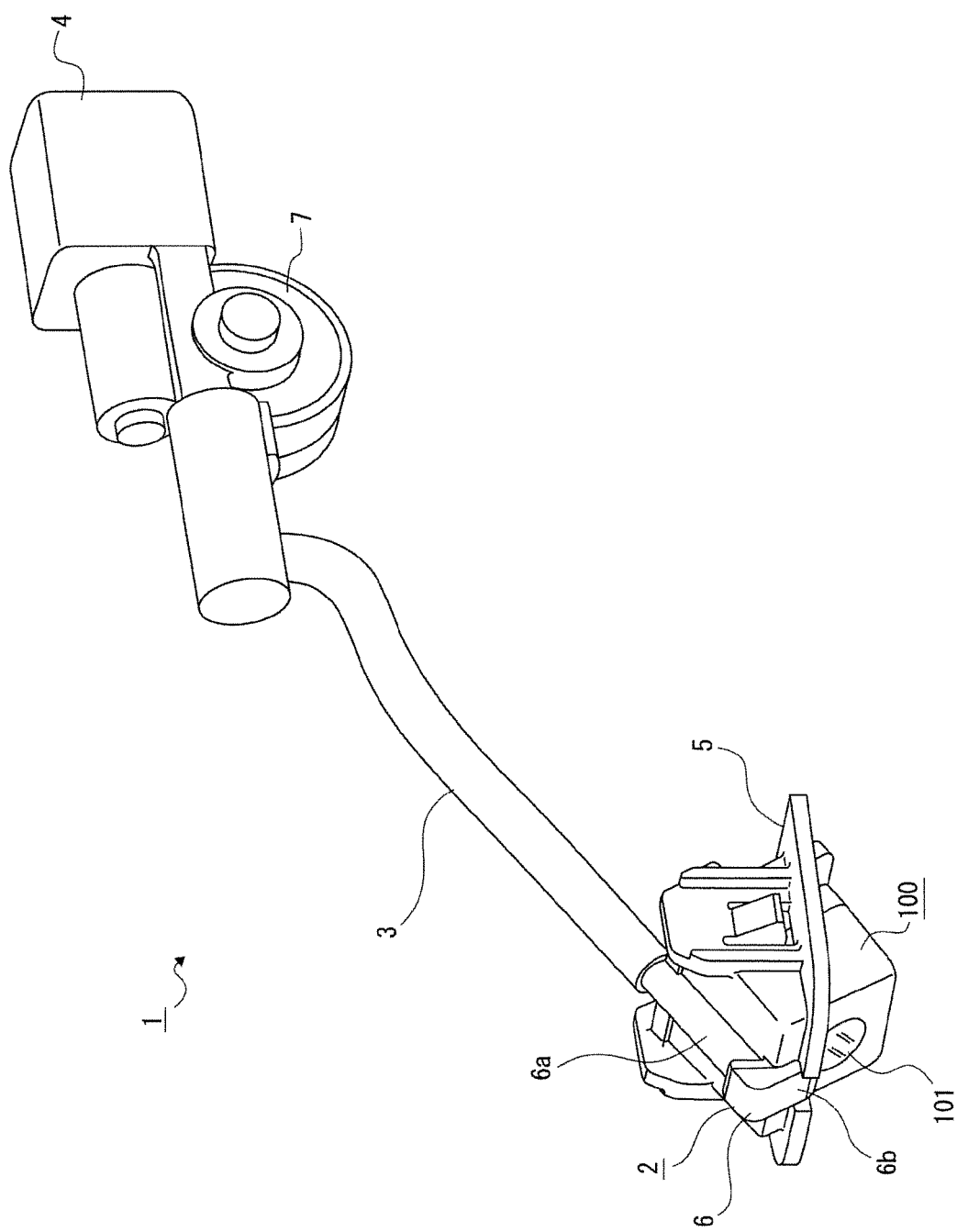
FIG. 1 is a perspective view of a foreign matter removal device, depicting an illustrative embodiment of a foreign matter removal device of the present invention, together with FIGS. 2 to 13.

The foreign matter removal device 1 includes a nozzle unit 2, a piping 3 and a high-pressure air generation unit 4 (refer to FIG. 1).

The nozzle unit 2 has a mounting bracket 5 and a nozzle 6. The mounting bracket 5 is mounted to a rear end portion of the vehicle body. The nozzle 6 has a cylindrical flow part 6a extending in the front and rear direction and an injection part 6b continuous to a rear end of the flow part 6a, and is formed integrally with the mounting bracket 5.

The nozzle unit 2 is formed integrally with the in-vehicle camera 100. The in-vehicle camera 100 has an imaging unit. A rear end portion of the imaging unit is configured as a lens part 101. Accordingly, the in-vehicle camera 100 is configured to capture an image of a subject through the lens part 101.

As described above, in the foreign matter removal device 1, the nozzle 6 is formed integrally with the in-vehicle camera 100. Therefore, the nozzle 6 and the in-vehicle camera 100 can be simultaneously mounted to the vehicle body by a single operation, so that the mounting operation thereof to the vehicle body can be easily and quickly performed, which improves the operability.

The piping 3 is a hose made of resin or rubber, for example. A front end portion thereof is coupled to one end portion of a cylinder (to be described later) of the high-pressure air generation unit 4 and a rear end portion thereof is coupled to a front end portion of the flow part 6a of the nozzle 6.

Figure 2:
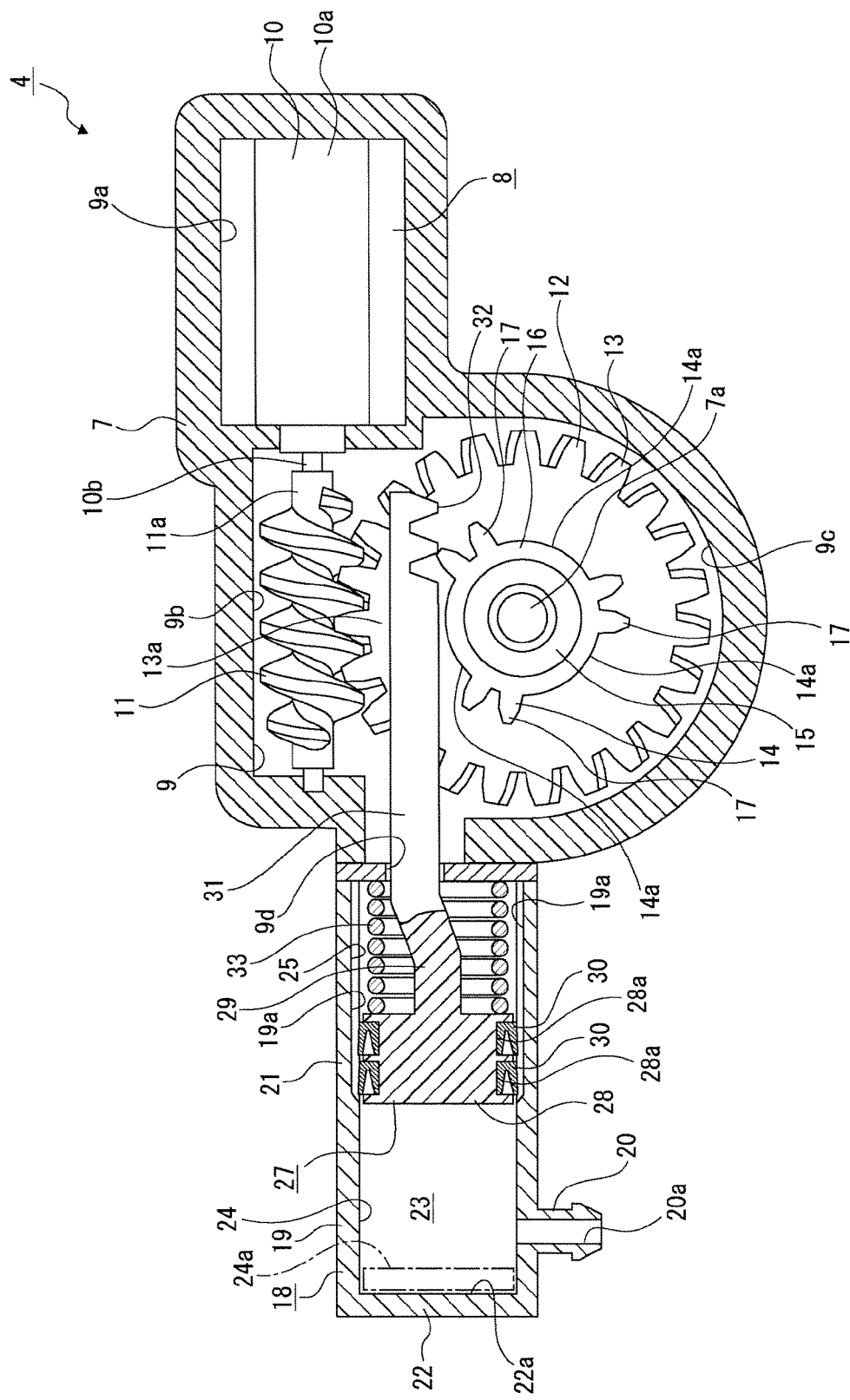
FIG. 2 depicts an internal structure of a high-pressure air generation unit.

The high-pressure air generation unit 4 includes a case body 7 and a moving mechanism 8 disposed in the case body 7 (refer to FIG. 2). The high-pressure air generation unit 4 is mounted to a part of the vehicle body in the vehicle.

An interior of the case body 7 is formed as an arrangement space 9, which has a motor arranging part 9a, a worm arranging part 9b and a gear arranging part 9c. The motor arranging part 9a and the worm arranging part 9b are positioned in communication with each other in the front and rear direction, and the worm arranging part 9b and the gear arranging part 9c are positioned in communication with each other in the upper and lower direction. An insertion hole 9d penetrating in the front and rear direction is formed at a rear end portion of the case body 7. The insertion hole 9d is in communication with the outside of the case body 7 and the gear arranging part 9c.

The case body 7 is provided with a support shaft part 7a protruding laterally. The support shaft part 7a is positioned in the gear arranging part 9c.

The moving mechanism 8 includes a motor 10, a worm 11 and a worm wheel 12.

The motor 10 has a main body part 10a and a motor shaft 10b. The main body part 10a is arranged in the motor arranging part 9a (refer to FIG. 2).

The worm 11 is fixedly coupled to the motor shaft 10b and is arranged in the worm arranging part 9b. The worm 11 functions as the main driving gear.

Figure 3:
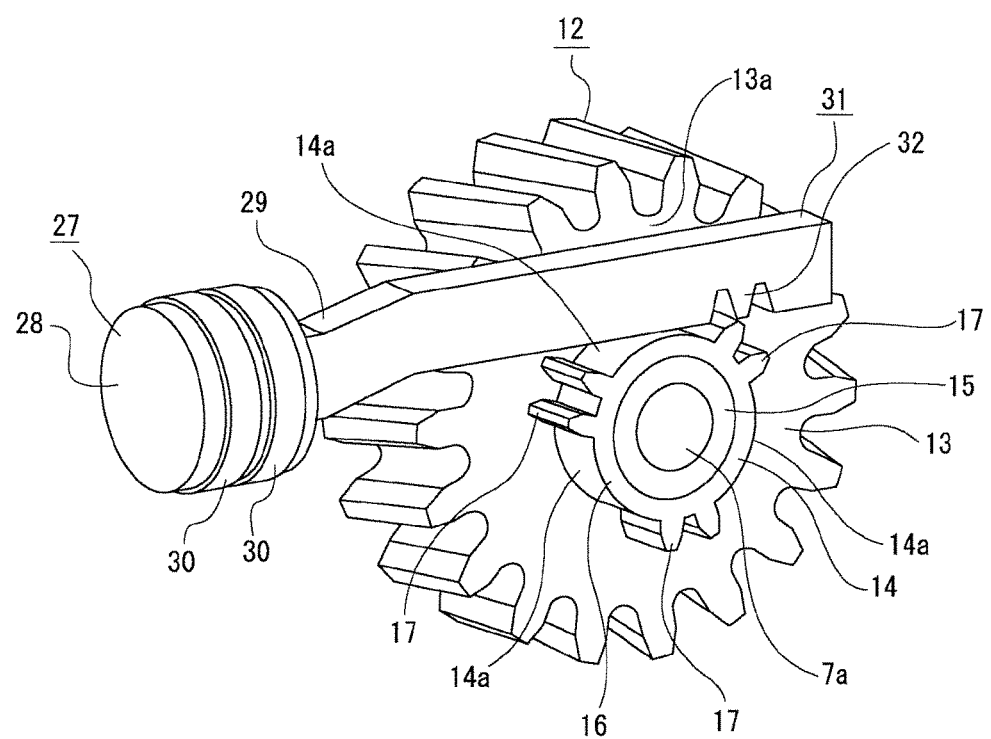
FIG. 3 is an enlarged perspective view depicting a worm wheel, a piston and a rack.

The worm wheel 12 functions as the driven gear and is configured by integrally forming a helical gear 13 and a pinion 14 protruding laterally from a central portion of the helical gear 13 (refer to FIGS. 2 and 3). The worm wheel 12 is arranged in the gear arranging part 9c, and is supported at a central portion thereof to the support shaft part 7a of the case body 7 via the bearing 15.

The helical gear 13 is engaged with the worm 11.

The pinion 14 is provided concentrically with the helical gear 13 and has an annular part 16 externally fitted and supported to the bearing 15 and gear parts 17, 17, 17 provided on an outer periphery of the annular part 16. The gear parts 17, 17, 17 are provided with being equally spaced in a circumferential direction.

The pinion 14 has a diameter of a tooth tip circle smaller than a diameter of a tooth bottom circle of the helical gear 13. Therefore, the helical gear 13 is formed at a side, at which the pinion 14 is positioned, with a side surface 13a located at an outer periphery of the pinion 14. Parts of the pinion 14 between the gear parts 17, 17, 17 are respectively formed as toothless parts 14a, 14a, 14a. For example, the three toothless parts 14a are formed with being equally spaced in the circumferential direction.

As described above, the worm wheel 12 is made by integrally forming the helical gear 13 and the pinion 14. Therefore, it is possible to reduce the number of components and to effectively transmit a driving force, which is to be transmitted from the motor 10 to the helical gear 13, to the pinion 14, so that it is possible to reduce a size of the motor 10.

A cylinder 18 is coupled to the rear end portion of the case body 7. The cylinder 18 is coupled with protruding rearwards from the case body 7. The cylinder 18 is made by integrally forming a piston support part 19 and a coupling protrusion 20 protruding downwards from the piston support part 19, for example, and a diameter of the piston support part 19 is set greater than a diameter of the coupling protrusion 20.

The piston support part 19 has a substantially cylindrical cylinder-shaped part 21 extending in the front and rear direction and a closing part 22 configured to close a rear opening of the cylinder-shaped part 21. An inner surface of the closing part 22 is formed as a closed surface 22a.

An internal space 23 of the piston support part 19 includes a first space 24, which is a substantially rear half part, and a second space 25, which is a substantially front half part.

Figure 4:
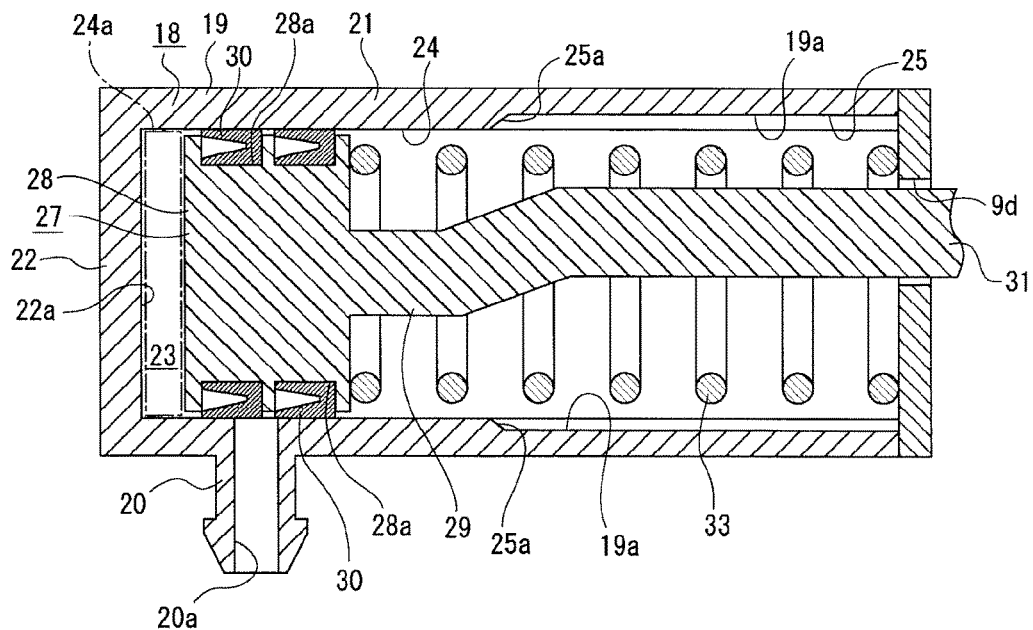
FIG. 4 is an enlarged sectional view depicting a state where the piston is located at a top dead center.
Figure 5:
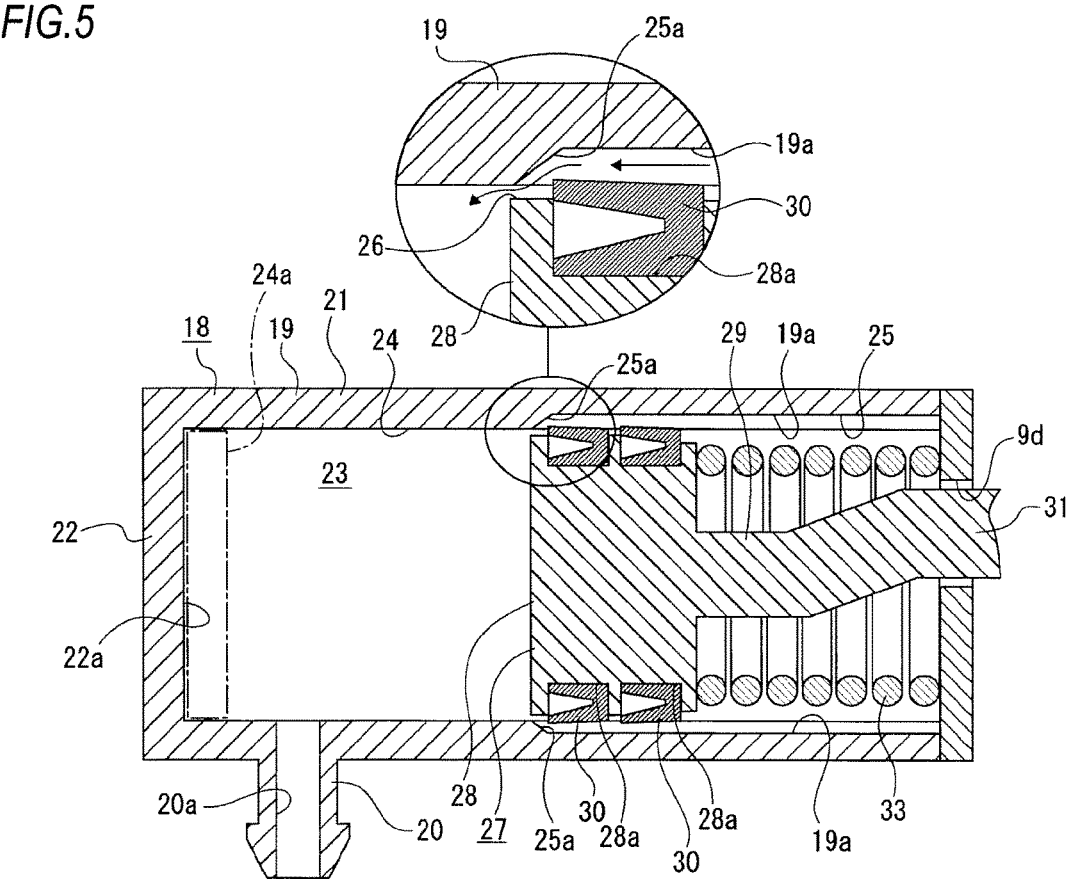
FIG. 5 is an enlarged sectional view depicting a state where the piston is located at a bottom dead center.
Figure 6:
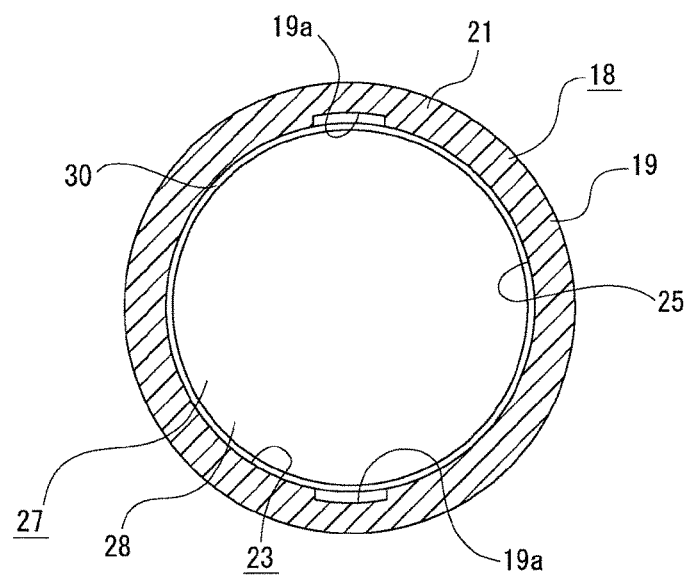
FIG. 6 is an enlarged sectional view depicting a cylinder and the piston.

Air inlet grooves 19a, 19a extending in the front and rear direction and spaced in the circumferential direction are formed in the second space 25 of the piston support part 19 (refer to FIGS. 4 to 6). The air inlet grooves 19a, 19a are located at 180° opposite sides, for example. Meanwhile, the number of the air inlet groove 19a is optional. When a plurality of air inlet grooves 19a is provided, these air inlet grooves are preferably formed being equally spaced in the circumferential direction.

Since the air inlet grooves 19a, 19a are formed in the second space 25 of the piston support part 19, a part of the second space 25 where the air inlet grooves 19a, 19a are formed has a diameter slightly greater than that of the first space 24. A part of the second space 25 where the air inlet grooves 19a, 19a are not formed has the same diameter as that of the first space 24. In the second space 25 of the piston support part 19, stepped surfaces 25a, 25a are respectively formed at boundary portions between the first space 24 and the air inlet grooves 19a, 19a (refer to FIGS. 4 and 5).

The cylinder-shaped part 21 of the piston support part 19 is formed with an air inlet hole (not shown) from which an outside air is introduced into the air inlet grooves 19a, 19a.

An internal space of the coupling protrusion 20 is formed as a delivery path 20a for delivering the high-pressure air towards the nozzle 6. The coupling protrusion 20 is coupled with a front end portion of the piping 3.

The coupling protrusion 20 is continuous to the cylinder-shaped part 21 and is located further forwards the closed surface 22a of the closing part 22 (refer to FIGS. 4 and 5). Therefore, a predetermined interval is formed between the closed surface 22a and a rear end of the delivery path 20a, and a storage part 24a, which is a part of the internal space 23, is formed between the closed surface 22a of the piston support part 19 and the delivery path 20a of the coupling protrusion 20.

A piston 27 is movably supported to the piston support part 19 of the cylinder 18. The piston 27 has a substantially cylindrical column-shaped actuating part 28 of which a thickness in the front and rear direction is thin and a coupling part 29 protruding substantially forward from a central portion of the actuating part 28. The actuating part 28 is formed with circular ring-shaped arrangement grooves 28a, 28a opening outwards with being spaced in the front and rear direction. An outer diameter of the actuating part 28 is slightly smaller than the diameter of the first space 24 of the piston support part 19. Therefore, a gap 26 is formed between an outer peripheral surface of the actuating part 28 and an inner peripheral surface of the piston support part 19 in the first space 24.

Seal parts 30, 30 are respectively arranged in the arrangement grooves 28a, 28a. The seal part 30 is formed of, for example, an elastically deformable rubber or resin and an outer periphery thereof protrudes outward from the outer peripheral surface of the actuating part 28.

The piston 27 is configured to reciprocate in the front and rear direction between a top dead center and a bottom dead center with respect to the cylinder 18. At the top dead center, the actuating part 28 is entirely positioned in the first space 21a (refer to FIG. 4). At the bottom dead center, the seal parts 30, 30 are entirely positioned in the second space 25 and a rear end portion of the actuating part 28 is positioned in the first space 24 (refer to FIG. 5).

The seal parts 30, 30 of the piston 27 slide on an inner peripheral surface of the cylinder 18 in the first space 21a (refer to FIG. 4). Further, the seal parts 30, 30 slide on an inner peripheral surface of a part of the cylinder 18 other than the air inlet grooves 19a, 19a in the second space 25, and are spaced away from an inner peripheral surface of the piston support part 19 of the cylinder 18 at the parts where the air inlet grooves 19a, 19a are formed (refer to FIG. 5). Therefore, at a state where the piston 27 is positioned at the bottom dead center, the air (outside air) introduced into the second space 25 flows toward the first space 24 through the gap 26 along the stepped surfaces 25a, 25a.

A rack 31 extending in the front and rear direction is coupled to the coupling part 29 of the piston 27. The rack 31 is formed integrally with the piston 27, for example.

The rack 31 is formed with a rack part 32 at a position close to a front end thereof. The rack 31 is inserted into the insertion hole 9d formed in the case body 7 and the rack part 32 is configured to be engageable with the gear part 17 of the pinion 14 of the worm wheel 12.

Between the actuating part 28 of the piston 27 and an outer surface of the case body 7, an urging spring 33 is supported in the piston support part 19 of the cylinder 18. The urging spring 33 is, for example, a compression coil spring. The piston 27 and the rack 31 are urged rearward by the urging spring 33.

In the meantime, regarding a moving direction of the piston 27, a rear direction in which the air is to be delivered is a delivery direction, and a front direction, which is an opposite direction to the delivery direction, is a force accumulation direction. The force accumulation direction is a direction in which the piston 27 is to move against an urging force of the urging spring 33. As the piston 27 is moved in the force accumulation direction, a moving force in the delivery direction, which is to be applied to the piston 27 by the urging force of the urging spring 33, increases.

<Operation of Foreign Matter Removal Device>

In the below, an operation of the foreign matter removal device 1 is described (refer to FIGS. 7 to 10).

Figure 7:
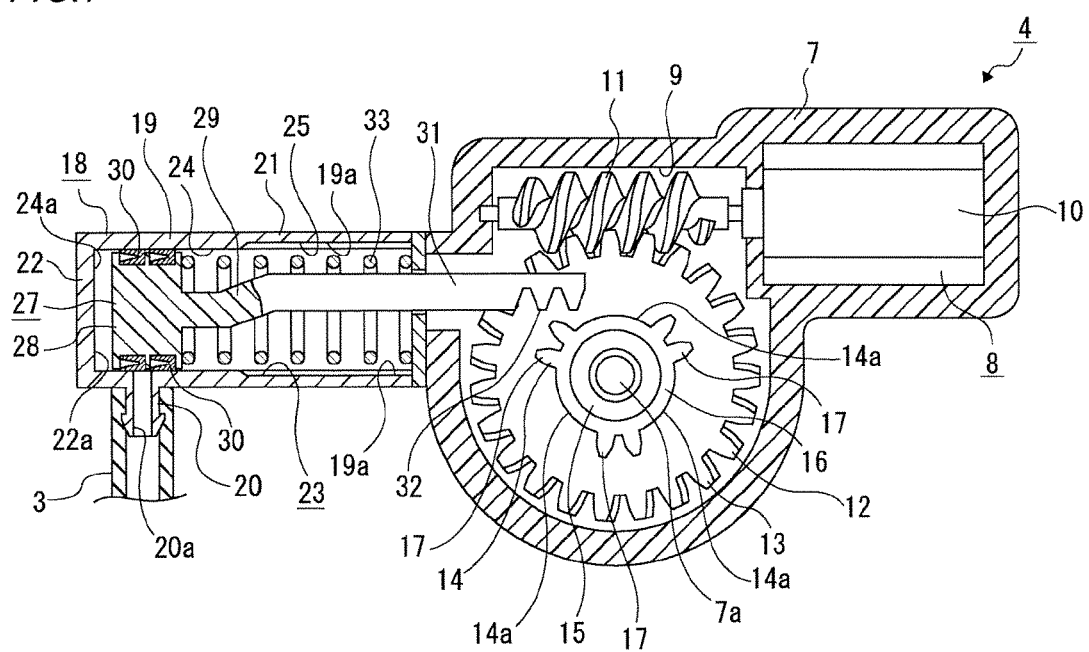
FIG. 7 is a sectional view depicting an initial state, which illustrates operations of the foreign matter removal device, together with FIGS. 8 to 10.

First, an initial state before high-pressure air is delivered is described (refer to FIG. 7).

At the initial state, the piston 27 is positioned at the rear in the moving direction, and the rack 31 is positioned at a state where the rack part 32 can engage with the gear parts 17, 17, 17 of the pinion 14.

Figure 8:
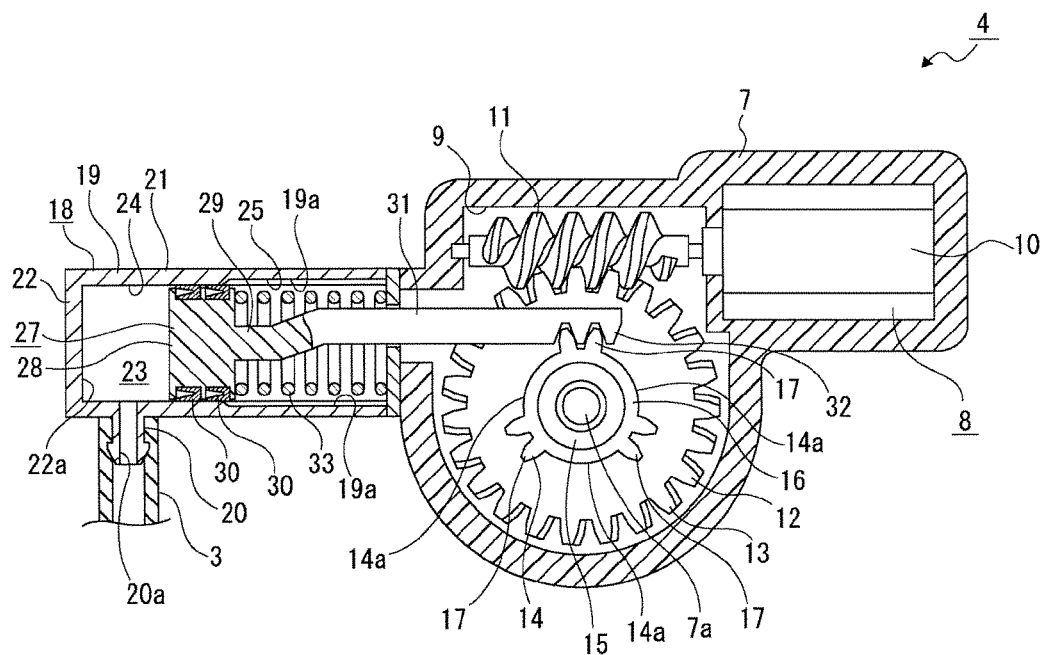
FIG. 8 is a sectional view depicting a state where the piston is moving towards the bottom dead center.

When the driving of the motor 10 starts at the initial state and a driving force of the motor 10 is transmitted to the worm wheel 12 through the worm 11, the gear part 17 of the pinion 14 is engaged with the rack part 28 of the rack 31 (refer to FIG. 8). Therefore, as the pinion 14 is rotated, the rack 31 is moved in the force accumulation direction against the urging force of the urging spring 33.

Figure 9:
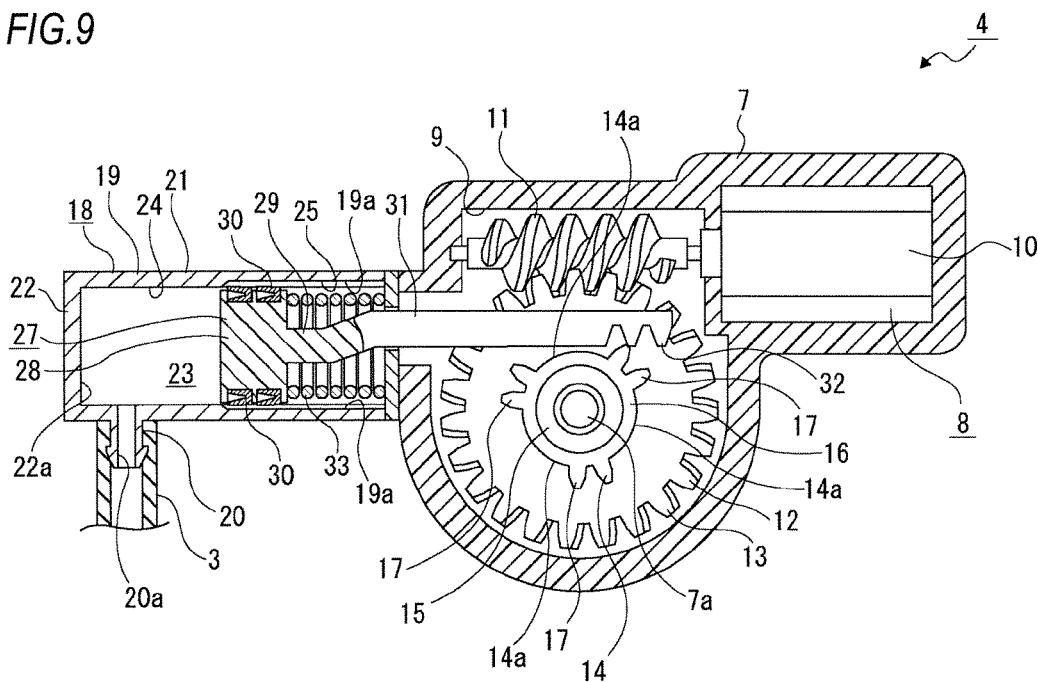
FIG. 9 is a sectional view depicting a state where the piston has been moved to the bottom dead center.
Figure 10:
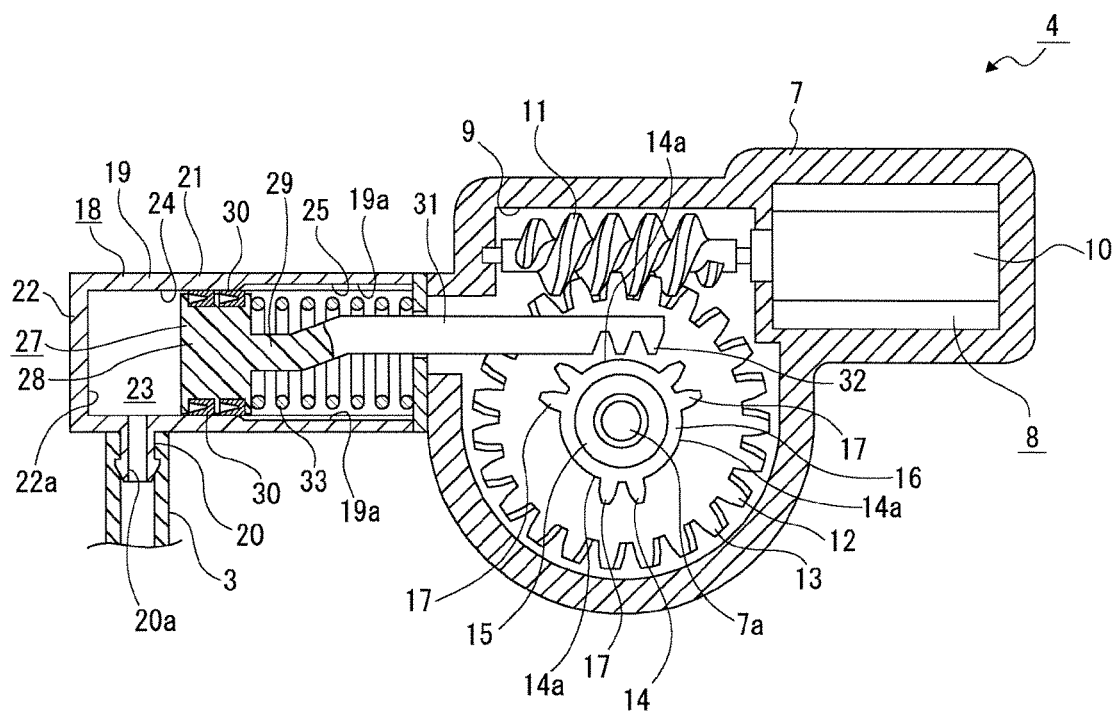
FIG. 10 is a sectional view depicting a state where the piston is moving towards the top dead center.

When the rack 31 is moved in the force accumulation direction as the pinion 14 is rotated, the engaged state between the gear part 17 and the rack part 32 is released at a predetermined position (refer to FIG. 9). The position at which the engaged state between the gear part 17 and the rack part 32 is released is the bottom dead center of the piston 27. At the state where the piston 27 is positioned at the bottom dead center, the air (outside air) introduced into the second space 25 flows towards the first space 24 through the gap 26 along the stepped surfaces 25a, 25a, as described above.

When the piston 27 is moved to the bottom dead center, the engaged state between the gear part 17 and the rack part 32 is released, so that the piston 27 is moved in the delivery direction at higher speed than a moving speed in the force accumulation direction by the urging force of the urging spring 33 (refer to FIG. 10) and the air introduced into the first space 24 from the second space 25 is delivered from the first space 24 towards the nozzle 6 of the nozzle unit 2 through the delivery path 20a of the coupling protrusion 20. At this time, since the cylinder 18 has a configuration where the diameter of the coupling protrusion 20 is smaller than that of the piston support part 19, the air delivered from the first space 24 through the delivery path 20a is compressed into high-pressure air, which is then delivered from the piping 3 towards the nozzle 6. Then, the high-pressure air is injected from the nozzle 6 and blown to the lens part 101 of the imaging unit of the in-vehicle camera 100.

During the movement of the piston 27 in the delivery direction by the urging force of the urging spring 33, the high-pressure air is delivered from the coupling protrusion 20 towards the nozzle 6 and the delivery path 20a of the coupling protrusion 20 is closed by the seal parts 30, 30 of the piston 27. When the delivery path 20a is closed by the seal parts 30, 30, a part of the air in the internal space 23 pressed by the actuating part 28 of the piston 27 is confined in the storage part 24a. The confined air is pressed by the actuating part 28, so that the compressed air is generated.

Like this, when the piston 27 is moved in the delivery direction, the air confined in the storage part 24a becomes the compressed air, so that the compressed air functions as an air spring and the movement of the piston 27 in the delivery direction is restrained. Therefore, the piston 27 is stopped at a position immediately before the actuating part 28 is contacted to the closed surface 22a by the compressed air, and the stop position is the top dead center of the piston 27.

In the meantime, at the state where the piston 27 is moved in the delivery direction by the urging force of the urging spring 33 and is then stopped, the rear seal part 30 close to the closed surface 22a may be positioned at the rear of the rear end of the delivery path 20a. However, since the piston 27 is provided with the two seal parts 30, 30 spaced in the front and rear direction, even when the rear seal part 30 is positioned at the rear of the rear end of the delivery path 20a, a front end of the front seal part 30 is positioned further forwards a front end of the delivery path 20a.

Therefore, the delivery path 20a is closed by the seal parts 30, 30, so that it is possible to prevent the air introduced into the internal space 23 from being unnecessarily discharged from the delivery path 20a.

The high-pressure air injected from the nozzle 6 is blown to the lens part 101, so that foreign matters such as dust, mud and water droplets attached to the lens part 101 are blown away and the contamination of the lens part 101 is thus addressed.

As described above, in the foreign matter removal device 1, the diameter of at least a part of the second space 25 of the cylinder 18 is set greater than that of the first space 24. Further, when the piston 27 is moved to the bottom dead center, the seal parts 30, 30 are entirely located in the second space 25 and the air introduced into the second space 25 flows from the second space 25 towards the first space 24.

Therefore, even when the foreign matters such as dust and mud enter the nozzle 6 and an injection port of the nozzle 6 is thus clogged by the foreign matters, the air is securely introduced into the first space 24 of the cylinder 18 and the foreign matters clogging the nozzle 6 are blown away by the high-pressure air introduced into the first space 24 and delivered by the piston 27. Therefore, the clogging of the nozzle 6 due to the foreign matters can be addressed, so that it is possible to secure the favorable injection state of the high-pressure air from the nozzle 6.

The above-described reciprocating movement of the piston 27 between the top dead center and the bottom dead center is performed by using an engagement between the gear part 17 of the pinion 14 and the rack part 31 of the rack 31 and a release thereof as one cycle, and the movement of the piston 27 in the delivery direction is performed by the presence of the toothless part 14a of the pinion 14.

Therefore, since the piston 27 is moved in the delivery direction by the presence of the toothless part 14a, there is no need to provide a dedicated mechanism for moving the piston 27 in the delivery direction. As a result, the size reduction by the simplification of the mechanism of the foreign matter removal device 1 can be achieved.

Also, since the foreign matter removal device 1 has the configuration where the gear parts 17, 17, 17 are provided at three positions spaced in the circumferential direction of the pinion 14 and the three toothless parts 14a, 14a, 14a are formed, the reciprocating movement of the piston 27 between the top dead center and the bottom dead center is performed three times (three cycles) during one rotation of the pinion 14.

Therefore, the number of times of injection of the high-pressure air from the nozzle 6 during one rotation of the pinion 14 is increased, so that it is possible to improve the injection efficiency in the foreign matter removal device 1.

BRIEF SUMMARY

As described above, in the foreign matter removal device 1, the cylinder 18 is provided with the piston support part 19 configured to support the piston 27 and the coupling protrusion 20 having the delivery path 20a for delivering the high-pressure air, and the coupling protrusion 20 is located further towards the force accumulation direction than the closed surface 22a of the piston support part 19.

Also, when the piston 27 is moved in the delivery direction, a part of the air in the cylinder 18 is compressed and the compressed air is thus generated, and the compressed air is confined in the storage part 24a, which is an end portion in the cylinder 18 in the delivery direction.

Therefore, when the piston 27 is moved in the delivery direction, the compressed air is interposed between the piston 27 and the end portion of the cylinder 18 in the delivery direction. Thereby, contact between the piston 27 and the end portion of the cylinder 18 in the delivery direction is avoided, so that it is possible to prevent occurrence of an abnormal sound and damages and failures of the piston 27 and the cylinder 18.

Also, since the driving force of the motor 10 is transmitted to the piston 27 via the worm 11 and the worm wheel 12, a reduction mechanism where a large reduction ratio is to be obtained by a simple mechanism having a small number of components is configured by using the worm 11 and the worm wheel 12. Also, it is possible to secure high conversion efficiency of the moving force of the piston 27 to the driving force of the motor 10 by the simple mechanism.

Also, since the worm 11 is used as the main driving gear and the worm wheel 12 is used as the driven gear, a reduction mechanism where a large reduction ratio is to be obtained by a simple mechanism is configured and high conversion efficiency of the moving force of the piston 27 to the driving force of the motor 10 can be secured by a simpler mechanism.

Modified Embodiments of Moving Mechanism

Figure 12:
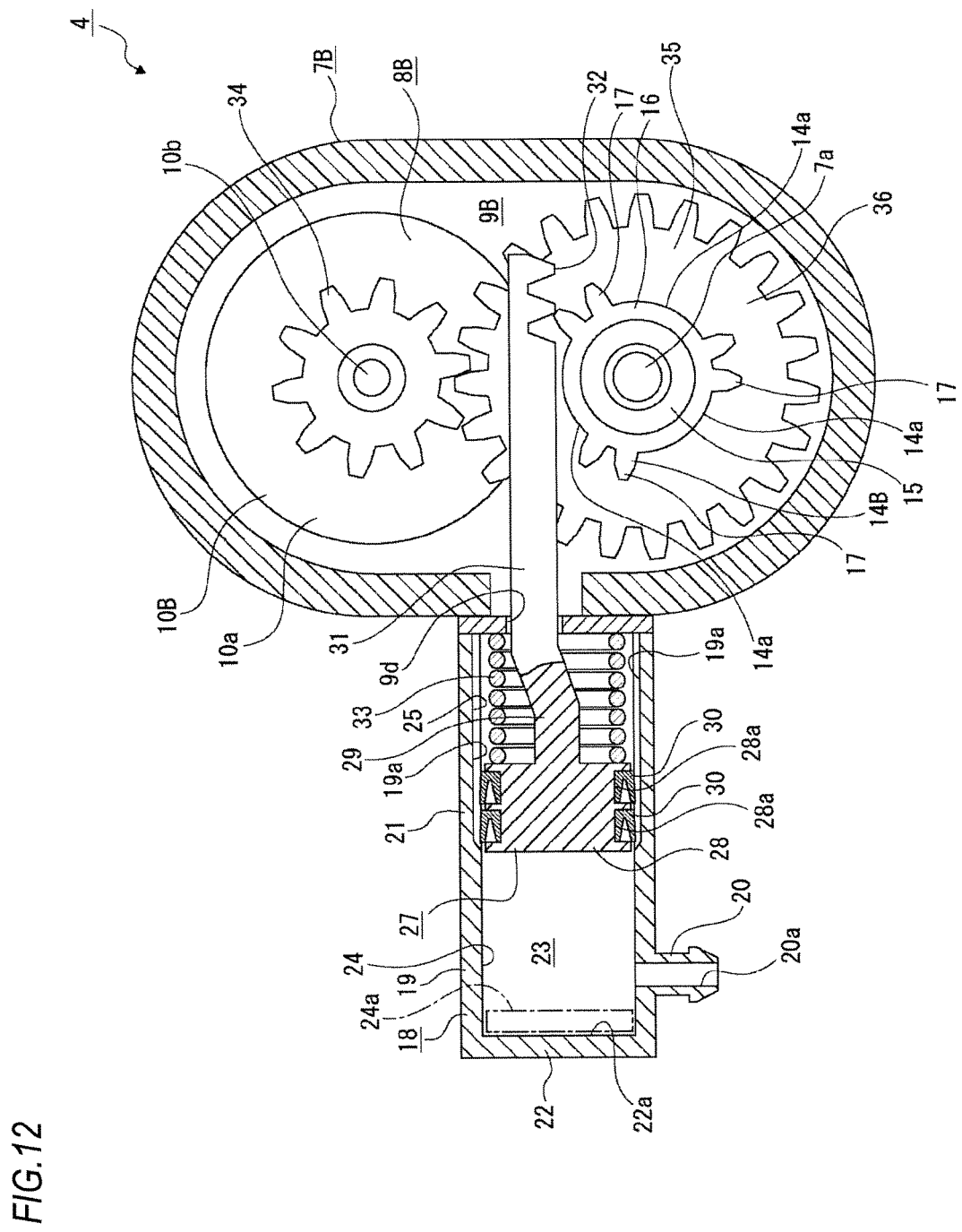
FIG. 12 depicts an internal structure of the high-pressure air generation unit in which a moving mechanism of a second modified embodiment is used.
Figure 13:
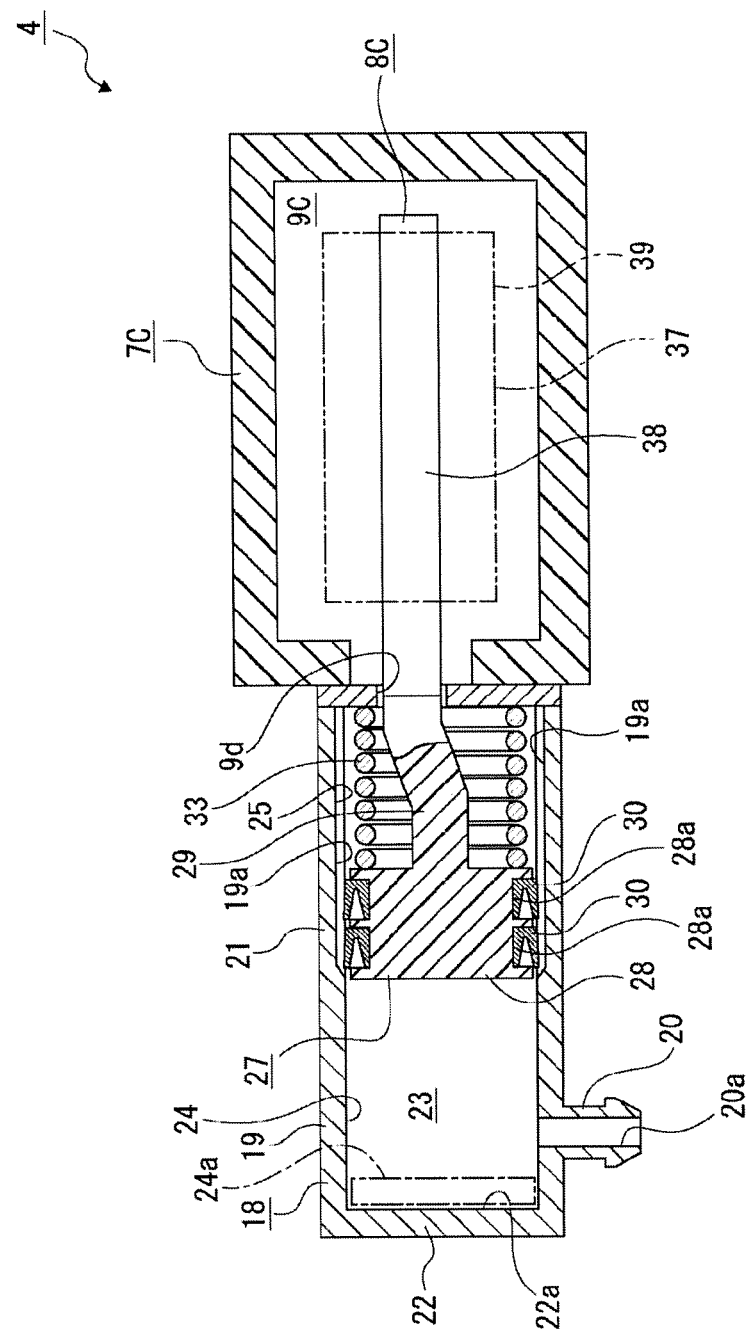
FIG. 13 depicts an internal structure of the high-pressure air generation unit in which a moving mechanism of a third modified embodiment is used.

In the below, each modified embodiment of the moving mechanism is described (refer to FIGS. 11 to 13). In the meantime, shapes and dimensions of case bodies 7A, 7B, 7C in which moving mechanisms of modified embodiments are arranged are changed with respect to the case body 7 in accordance with respective structures of the moving mechanisms and arrangement spaces 9A, 9B, 9C corresponding to the respective structures are formed in the case bodies.

Figure 11:
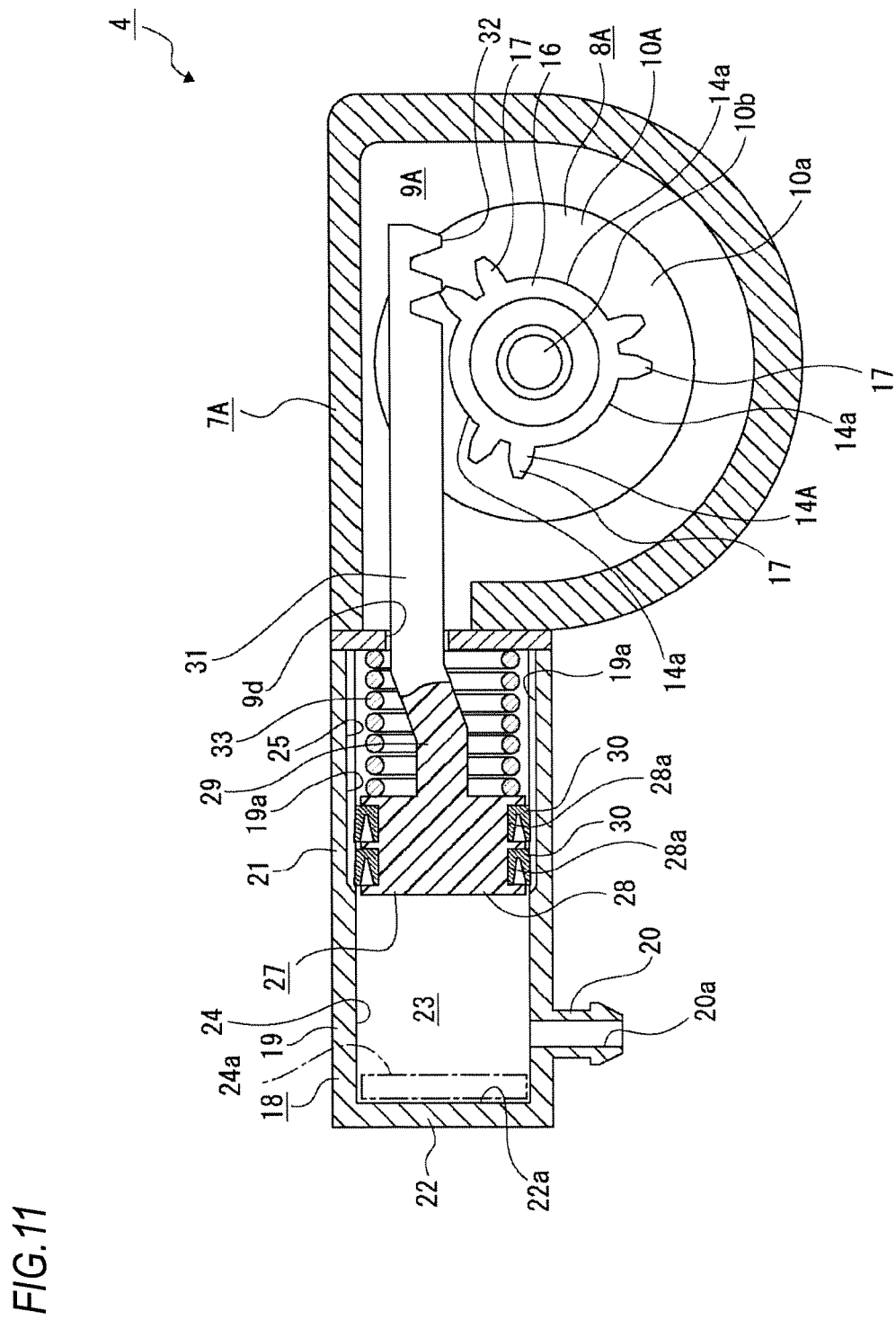
FIG. 11 depicts an internal structure of the high-pressure air generation unit in which a moving mechanism of a first modified embodiment is used.

First, a moving mechanism 8A of a first modified embodiment is described (refer to FIG. 11).

The moving mechanism 8A includes a motor 10A and a pinion 14A.

The motor 10A has a main body part 10a and a motor shaft 10b. The motor shaft 10b is arranged in a direction orthogonal to the moving direction of the rack 31.

The pinion 14A is fixedly coupled to the motor shaft 10b and functions as the main driving gear. The pinion 14A has the same configuration as the pinion 14 and includes the annular part 16 and the gear parts 17, 17, 17, and parts of the pinion between the gear parts 17, 17, 17 are respectively formed as the toothless parts 14a, 14a, 14a.

The rack part 32 of the rack 31 is formed as the driven gear, and the rack part 32 is configured to be engageable with the gear part 17 of the pinion 14A.

In the configuration where the moving mechanism 8A is provided, when the motor 10A starts to drive, the gear part 17 of the pinion 14A is engaged with the rack part 32 of the rack 31 and the rack 31 is moved in the force accumulation direction against the urging force of the urging spring 33.

When the engaged state between the gear part 17 and the rack part 32 is released at a predetermined position, the piston 27 is moved in the delivery direction at higher speed than the moving speed in the force accumulation direction by the urging force of the urging spring 33 and the air in the first space 24 is injected from the nozzle 6, as the high-pressure air.

In the moving mechanism 8A, since the driving force of the motor 10A is transmitted from the pinion 14A coupled to the motor shaft 10b to the rack 31, the structure is simple and the number of components of the foreign matter removal device 1 and the size thereof can be reduced.

Subsequently, a moving mechanism 8B of a second modified embodiment is described (refer to FIG. 12).

The moving mechanism 8B has a motor 10B, a transmission gear 34 and an actuating gear 35.

The motor 10B has a main body part 10a and a motor shaft 10b. The motor shaft 10b is arranged in a direction orthogonal to the moving direction of the rack 31.

The transmission gear 34 is a spur gear, is fixedly coupled to the motor shaft 10b and functions as the main driving gear.

The actuating gear 35 functions as the driven gear, and is made by integrally forming a spur gear 36 and a pinion 14B protruding laterally from a central portion of the spur gear 36. The actuating gear 35 is supported at a central portion thereof to a support shaft part 7a of a case body 7B via the bearing 15.

The spur gear 36 is engaged with the transmission gear 34.

The pinion 14B is arranged concentrically with the spur gear 36 and has the same configuration as the pinion 14.

The rack 31 is configured so that the rack part 32 is engageable with the gear part 17 of the pinion 14B.

In the configuration where the moving mechanism 8B is provided, when the motor 10B starts to drive, the driving force of the motor 10B is transmitted to the actuating gear 35 via the transmission gear 34, so that the gear part 17 of the pinion 14B is engaged with the rack part 32 of the rack 31 and the rack 31 is moved in the force accumulation direction against the urging force of the urging spring 33.

When the engaged state between the gear part 17 and the rack part 32 is released at a predetermined position, the piston 27 is moved in the delivery direction at higher speed than the moving speed in the force accumulation direction by the urging force of the urging spring 33 and the air in the first space 24 is injected from the nozzle 6, as the high-pressure air.

In the moving mechanism 8B, since the driving force of the motor 10B is transmitted to the rack 31 via the transmission gear 34 (the spur gear) and the actuating gear 35 having the spur gear 36, directions of rotation axes of the transmission gear 34 and the actuating gear 35 are the same.

Therefore, it is possible to reduce an arranging space of the moving mechanism 8B. Also, the structure is simple and the number of components of the foreign matter removal device 1 and the size thereof can be reduced.

Subsequently, a moving mechanism 8C of a third modified embodiment is described (refer to FIG. 13).

The moving mechanism 8C is configured by a solenoid 37.

The solenoid 37 includes a driving shaft 38 extending in the front and rear direction and a coil 39 in which the driving shaft 38 is inserted. The driving shaft 38 is an iron core, for example.

In the configuration where the moving mechanism 8C is provided, the rack 31 is not provided and the driving shaft 38 is coupled to the coupling part 29 of the piston 27.

In the configuration where the moving mechanism 8C is provided, when the coil 39 is energized and thus the solenoid 37 starts to drive, the driving shaft 38 and the piston 27 are integrally moved in the force accumulation direction against the urging force of the urging spring 33.

When the energization to the coil 39 is stopped at a predetermined position, the driving shaft 38 and the piston 27 are moved in the delivery direction at higher speed than the moving speed in the force accumulation direction by the urging force of the urging spring 33 and the air in the first space 24 is injected from the nozzle 6, as the high-pressure air.

In the moving mechanism 8C, since the driving shaft 38 of the solenoid 37 is coupled to the piston 27 and the driving force is transmitted to the piston 27, the structure is simple and the number of components of the foreign matter removal device 1 and the size thereof can be reduced.

First Illustrative Embodiment of Removal Drive Device

In the below, a removal drive device of an illustrative embodiment is described with reference to the drawings.

First, a first illustrative embodiment of the removal drive device configured to drive the foreign matter removal device 1 is described with reference to FIGS. 14 to 16.

Figure 14:
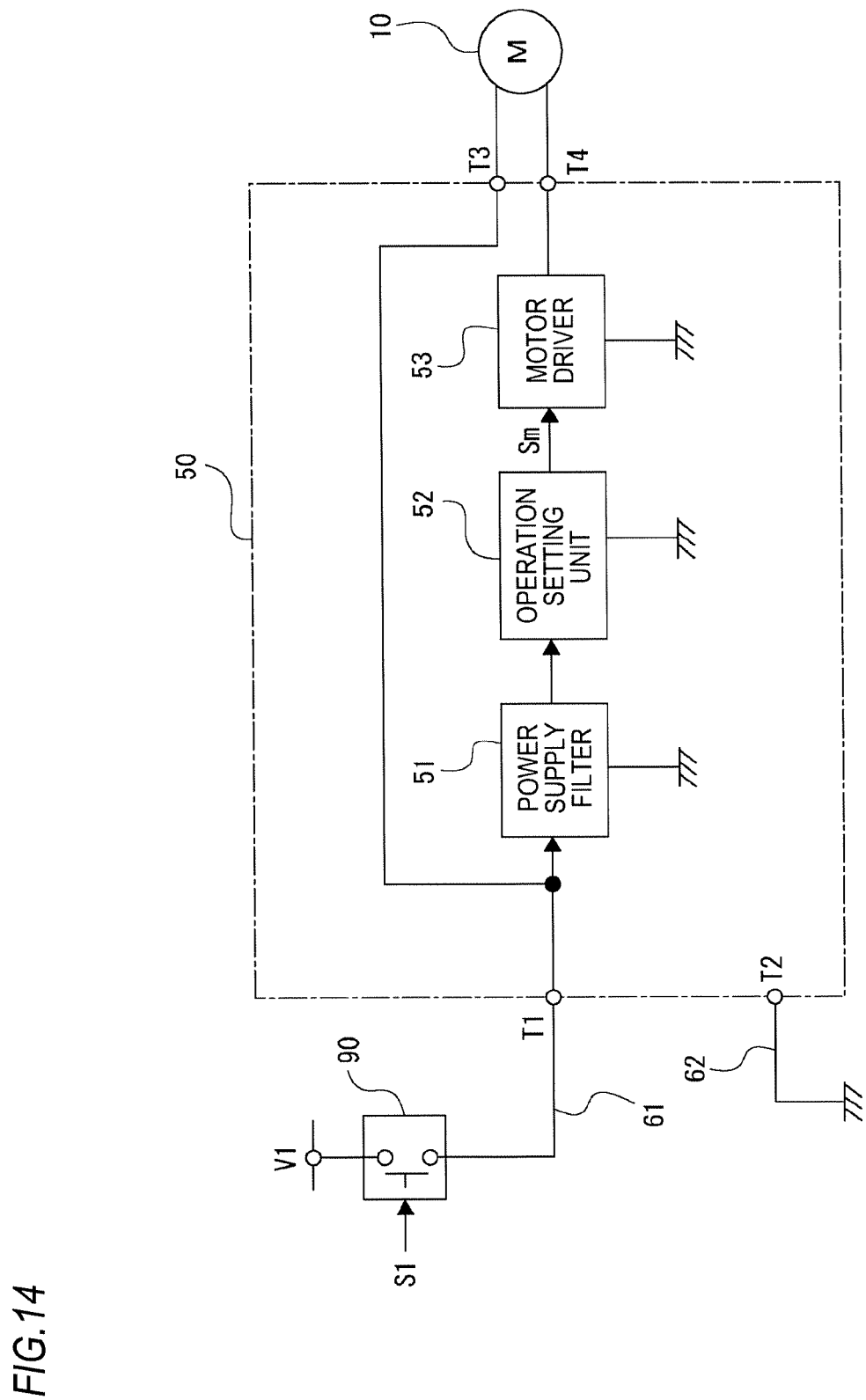
FIG. 14 is a block diagram of a first illustrative embodiment of a removal drive device.

FIG. 14 is a block diagram of a removal drive device 50. The removal drive device 50 is a device configured to supply driving current to the motor 10.

The removal drive device 50 has four terminals T1, T2, T3, T4, as a connection terminal to an outside of the device.

The terminal T1 is connected to a power supply line 61. The power supply line 61 is a line to which a power supply voltage V1 is to be supplied via a switch 90. The switch 90 is an on/off switch of a specific power supply system in the vehicle. For example, the power supply voltage is 12V, and the switch 90 becomes on by a signal S1, which is to be output as a gear position of the vehicle falls within a reverse range. Specifically, the power supply line 61 is a line of a rear lamp power supply system. Therefore, in the removal drive device 50 of the first illustrative embodiment, when the vehicle falls within the reverse range and thus a rear lamp turns on, the power supply voltage V1 of 12V is supplied to the terminal T1.

The terminal T2 is connected to a ground (for example, a vehicle body ground) by a ground line 62. The terminal T3 is connected to a positive electrode of the motor 10, and the terminal T4 is connected to a negative electrode of the motor 10. That is, the removal drive device 50 supplies the driving current between the terminals T3, T4, so that the motor 10 of the foreign matter removal device 1 drives and the above-described foreign matter removal operation is thus executed.

The removal drive device 50 is provided with a power supply filter 51, an operation setting unit 52 and a motor driver 53.

The power supply filter 51 is provided so as to protect a circuit in the removal drive device 50 from electric surge and noise, thereby preventing a malfunction.

The motor driver 53 is configured to supply the driving current to the motor 10 of the foreign matter removal device 1 and to enable the foreign matter removal device 1 to execute the foreign matter removal operation. In the first illustrative embodiment, the terminal T1 and the terminal T3 are connected, so that the power supply voltage V1 from the power supply line 61 is applied to the positive electrode of the motor 10 at the state of the reverse range. The motor driver 53 is configured to generate the driving current by connecting the terminal T4 (the negative electrode of the motor 10) to the ground (the terminal T2).

The motor driver 53 is configured to generate the driving current for a time period that is indicated by a signal Sm from the operation setting unit 52.

The operation setting unit 52 is configured to control a time period for which the motor driver 53 is to generate the driving current by the signal Sm.

Specifically, when the vehicle falls within the reverse range, the switch 90 becomes on and the power supply voltage V1 is applied to the terminal T1, the operation setting unit 52 performs the control so that the driving current is supplied to the motor 10 by the motor driver 53, for a first predetermined time. That is, when the power supply voltage V1 is applied, the foreign matter removal operation is performed in the foreign matter removal device 1 for the first predetermined time.

Also, the operation setting unit 52 is configured to control the motor driver 53 so that the driving current is not to be supplied to the motor 10 for a second predetermined time after the power supply voltage V1 is applied to the terminal T1, instead of executing the foreign matter removal operation immediately after the power supply voltage V1 is applied.

Figure 15A:
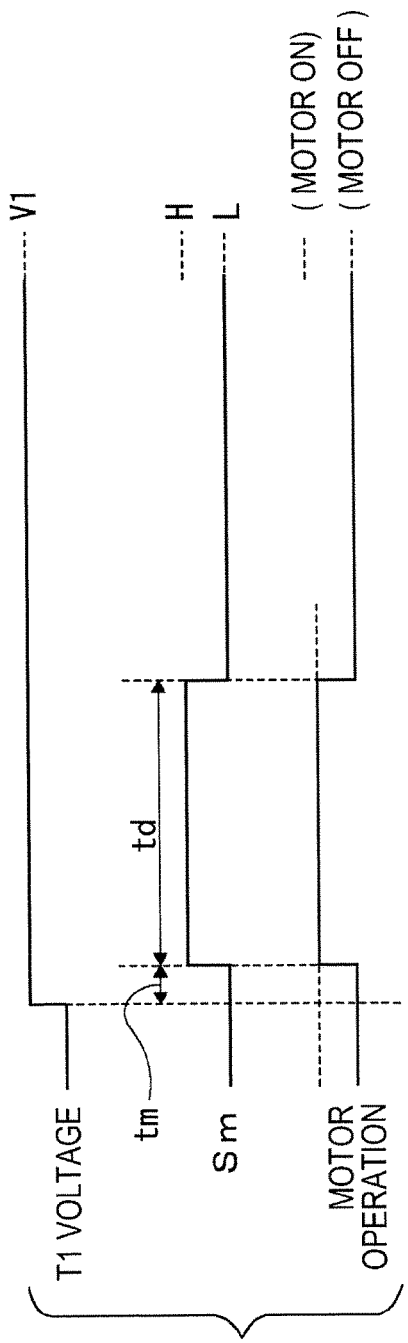
FIGS. 15A and 15B illustrate operations of the first illustrative embodiment of the removal drive device.

A driving operation is described with reference to FIGS. 15A and 15B. As shown in FIG. 15A, it is assumed that a terminal voltage of the terminal T1 becomes the power supply voltage V1 at predetermined time. The operation setting unit 52 does not enable the motor driver 53 to supply the driving current, immediately in response to the change in voltage of the terminal T1. Specifically, for second predetermined time tm (for example, about 0.2 second), the operation setting unit does not raise the signal Sm. After the second predetermined time tm elapses, the operation setting unit sets the signal Sm to an H level for first predetermined time td (for example, about 1.8 seconds) and enables the motor driver 53 to generate the driving current between the terminals T3, T4 for the first predetermined time. Therefore, for the first predetermined time td, the motor 10 operates, so that the foreign matter removal operation is executed. That is, for about 1.8 seconds, for example, the motor 10 rotates the worm 11, so that the piston 27 reciprocates several times and the high-pressure air is injected several times, as can be understood from the descriptions of FIGS. 2 to 5.

In the meantime, the power supply voltage V1 may be instantaneously applied to the terminal T1. For example, a case where the driver operates a shift lever to pass the reverse range may be exemplified. The shift lever falls instantaneously within the reverse range and the switch 90 becomes on, so that the power supply voltage V1 is temporarily applied to the terminal T1. This aspect is shown in FIG. 15B.

However, when a time period for which the terminal T1 becomes the power supply voltage V1 is shorter than the second predetermined time tm, the operation setting unit 52 does not raise the signal Sm. For this reason, the motor driver 53 does not supply the driving current to the motor 10.

Figure 16:
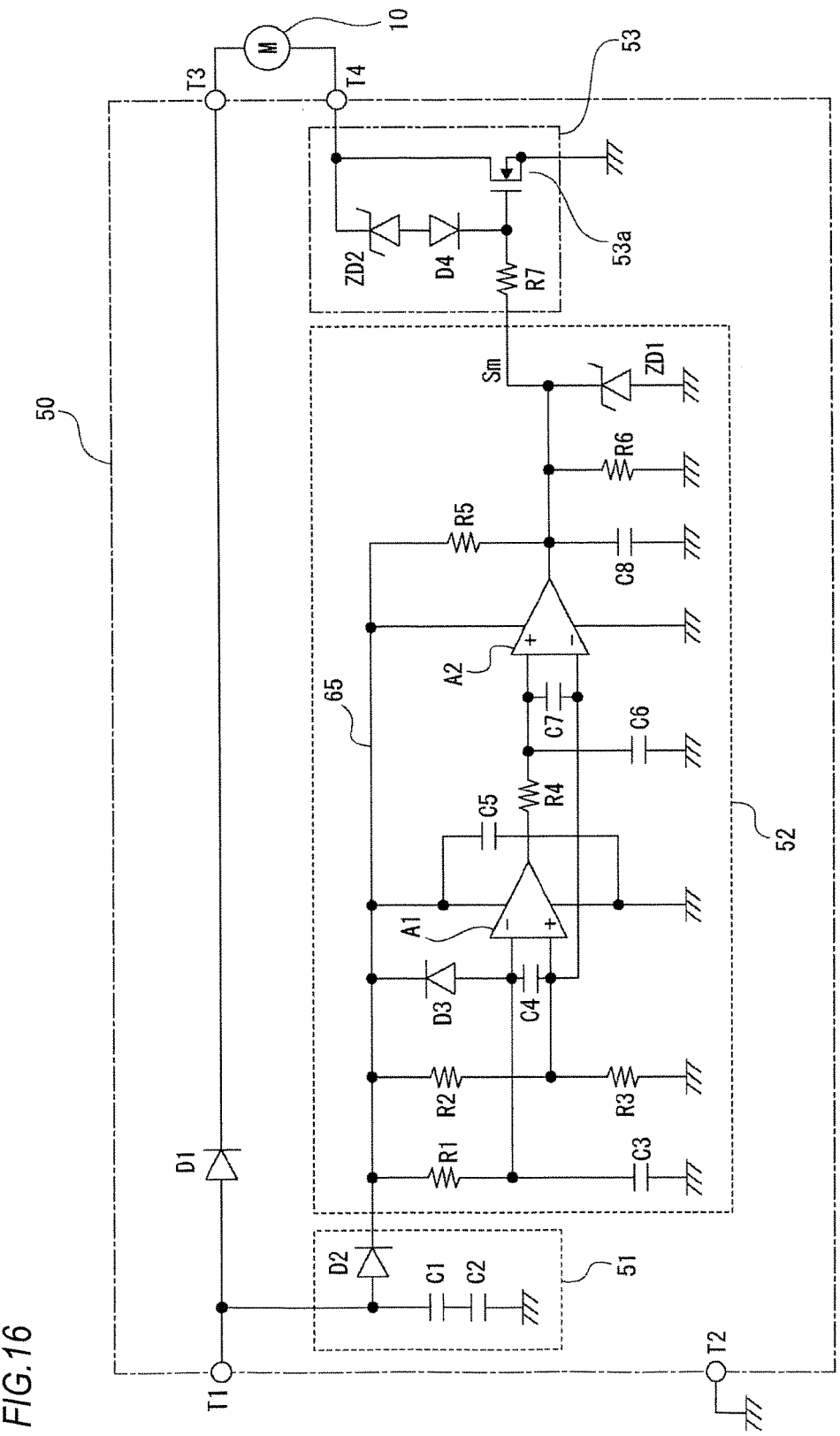
FIG. 16 is a circuit diagram of the first illustrative embodiment of the removal drive device.

An example of a specific circuit of the removal drive device 50 for implementing the above operations is shown in FIG. 16.

In the removal drive device 50, the terminal T1 is connected to the terminal T3 for a reverse-current protecting diode D1. Thereby, the power supply voltage V1 is applied from the terminal T3 to the positive electrode-side of the motor 10. Therefore, the negative electrode-side (terminal T4) of the motor 10 is connected to the ground, so that the driving current flows through the motor 10.

Meanwhile, in FIG. 16 (and FIGS. 14, 17 and 19), the ground symbols in the removal drive device 50 are all connected to the terminal T2 in the removal drive device 50, and the terminal T2 is connected to a vehicle body ground by a wiring and the like.

The power supply filter 51 includes capacitors C1, C2 and a diode D2. The surge protection is made by the capacitors C1, C2 connected in series between the terminal T1 and the ground.

The motor driver 53 is configured by a motor driver IC and is a circuit configured to connect the terminal T4 to the ground (terminal T2) in response to an input of the signal Sm.

The motor driver 53 is configured to perform a motor driving operation by an N-channel MOS-FET 53a and a resistance R7, in accordance with the signal Sm.

The MOS-FET 53a has a drain connected to the terminal T4 and a source connected to the ground (terminal T2). A gate of the MOS-FET 53a is supplied with the signal Sm via the resistance R7. A clamp circuit including a diode D4 and a Zener diode ZD2 is inserted between the drain and the gate of the MOS-FET 53a.

The MOS-FET 53a of the motor driver 53 is configured to be on/off by the signal Sm from the operation setting unit 52. When the MOS-FET 53a becomes on, the driving current flows through the motor 10. That is, the MOS-FET 53a functions as a driving switch of the motor 10.

Resistances R1 to R6, capacitors C3 to C8, a diode D3, a Zener diode ZD1 and comparators (operational amplifiers) A1, A2 are connected as shown, so that the operation setting unit 52 is configured. The operations of the operation setting unit 52 are described, as follows.

First, the first predetermined time td is defined by the resistances R1, R2, R3, the capacitor C3 and the comparator A1. Meanwhile, in the shown circuit, actually, (td+tm) is defined by an output of the comparator A1 and a time period of the second predetermined time tm is masked at the comparator A2 provided at a rear end.

A cathode-side of the diode D2 becomes the power supply line 65 of the comparators A1, A2. The resistance R1 and the capacitor C3 are connected in series between the power supply line 65 and the ground (terminal T2). Therefore, the capacitor C3 is charged from a point of time at which the supply of the power supply voltage V1 to the terminal T1 starts. A voltage associated with an amount of charge of the capacitor C3 is input to a (−) terminal of the comparator A1.

Also, the resistances R2, R3 are connected in series between the power supply line 65 and the ground, and a voltage divided at the resistances R2, R3 is input to a (+) terminal of the comparator A1, as a reference voltage.

Therefore, for a time period from the point of time at which the power supply voltage V1 is applied to the terminal T1 to a point of time at which the terminal voltage of the capacitor C3 associated with the amount of charge thereof reaches a predetermined value, i.e., the divided voltage by the resistances R2, R3, the output of the comparator A1 becomes an H level, and when the terminal voltage of the capacitor C3 exceeds the divided voltage by the resistances R2, R3, the output of the comparator A1 becomes an L level. Constants of the respective elements are set so that a timing at which the output is dropped to the L level is a timing beyond the first and second predetermined time (tm+td) of FIGS. 15A and 15B.

Then, the second predetermined time tm is set by the resistance R4, the capacitors C6 and the comparator A2. An output of a time constant circuit configured by the resistance R4 and the capacitor C6 is an input of a (+) terminal of the comparator A2. Also, the voltage divided at the resistances R2, R3 is input to the (−) terminal of the comparator A1, as the reference voltage.

In this case, since the output of the comparator A1 is supplied to the comparator A2 via the time constant circuit, even though the output of the comparator A1 becomes the H level at the point of time at which the power supply voltage V1 is applied to the terminal T1, the input voltage of the (+) terminal of the comparator A2 does not immediately reach the reference voltage. Therefore, immediately after the power supply voltage V1 is applied to the terminal T1, the output of the comparator A2 becomes the L level. Thereafter, when the input voltage of the (+) terminal of the comparator A2 rises and exceeds the reference voltage, the output of the comparator A2 becomes the H level. The reference voltage and the time constant are set so that the time period up to now is the second predetermined time tm of FIGS. 15A and 15B.

The output of the comparator A2 is stabilized by the capacitor C8 and is voltage-clipped by the Zener diode ZD1. A voltage value obtained at one end of the resistance R6 becomes the signal Sm for the motor driver 53.

In the motor driver 53, for the time period of the H level of the signal Sm, the MOS-FET 53a becomes on, so that the terminal T4 is connected to the terminal T2 (ground).

Therefore, as shown in FIG. 15A, as the power supply voltage V1 is supplied to the terminal T1, the signal Sm becomes the H level for the first predetermined time td after the second predetermined time tm elapses, and the driving current is supplied to the motor 10 for the corresponding time period, so that the foreign matter removal operation is performed by the foreign matter removal device 1.

Figure 15B:
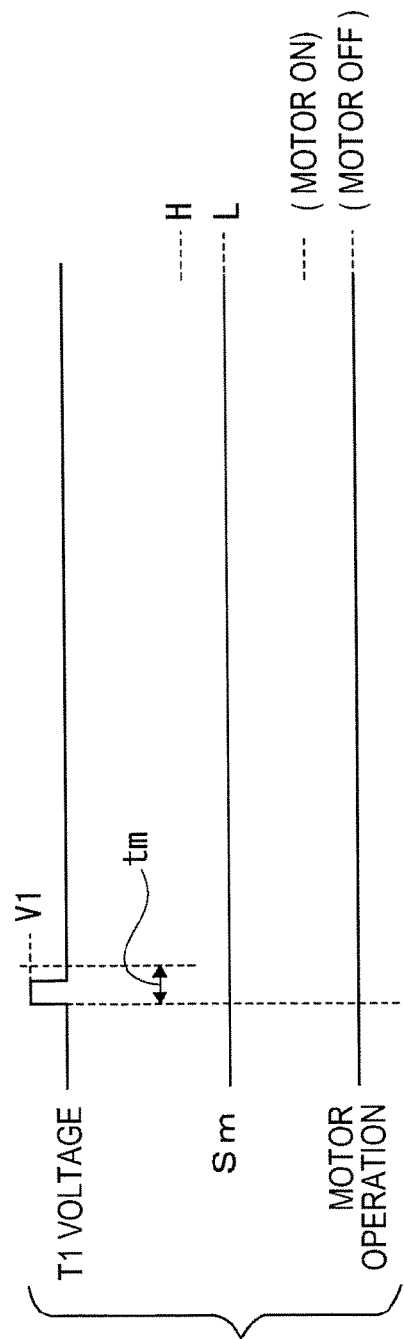

Also, as shown in FIG. 15B, when the power supply voltage V1 is applied only for a time period that does not reach the second predetermined time tm, since the output (signal Sm) of the comparator A2 is not the H level, the driving current is not supplied to the motor 10.

As described above, the removal drive device 50 of the first illustrative embodiment includes the terminal T1 connected to the power supply line in the vehicle, the terminal T2 connected to the ground line in the vehicle, the motor driver 53 configured to supply the driving current to the motor 10 of the foreign matter removal device 1 and to enable the foreign matter removal device 1 to execute the foreign matter removal operation, and the operation setting unit 52 configured to instruct the motor driver 53 to supply the driving current to the motor 10 only for the first predetermined time td as the power supply voltage V1 is applied to the terminal T1 at the state where the terminal T2 is connected to the ground.

That is, when the voltage between the power supply voltage V1 and the ground is applied between the terminals T1, T2, which is a trigger, the operation setting unit 52 sets the foreign matter removal drive time (first predetermined time Td). Thereby, in the minimum wiring configuration of only the connection between the power supply line and the ground line without providing an input system such as a dedicated control line, it is possible to execute the foreign matter removal on the imaging surface (the lens part 101) and the like of the in-vehicle camera 100 at the appropriate time period.

Also, only for the first predetermined time period Td, the foreign matter removal operation is performed, so that it is not necessary to excessively perform the foreign matter removal operation and the efficient operation is thus performed. Also, there is a merit that the operation control can be performed only by the power supply and the ground wiring.

Also, a dedicated control line is not required, so that it is possible to apply the above configuration to a variety of vehicles and to improve the degree of freedom of wiring.

Also, the example where the power supply line 61, to which the power supply voltage is supplied as the vehicle falls within the reverse range, is connected to the terminal T1 has been described. When the foreign matter removal device 1 sets the rear camera (the in-vehicle camera 100) of the vehicle as a target of the foreign matter removal, it is preferably to execute the foreign matter removal upon operation start of the rear camera. The terminal T1 is connected to the power supply line 61, to which the power supply voltage V1 is supplied as the vehicle falls within the reverse range, so that it is possible to start the foreign matter removal operation upon start of rear traveling of the vehicle, i.e., upon operation start of the in-vehicle camera 100, which is the rear camera.

Meanwhile, in general, the in-vehicle camera 100 (rear camera) and a monitor screen configured to display a captured image of the in-vehicle camera are activated and start an image display at about two seconds after the driver moves the shift lever to the reverse range. As described above, when the second predetermined time period tm is set to 0.2 second and the first predetermined time period Td is set to 1.8 seconds, the foreign matter removal is completed until the monitor screen display starts after the shift to the reverse range. Thereby, regarding the foreign matter removal on the imaging surface of the rear camera, the foreign matter removal operation is performed at the optimal timing immediately before performing the imaging and monitoring.

In other words, the foreign matter removal is not executed at a point of time at which the corresponding operation is not required so much, and it is possible to optimize the timing of the foreign matter removal operation and to implement the efficient foreign matter removal operation.

Also, the operation setting unit 52 controls the motor driver 53 not to supply the driving current to the motor 10 for the second predetermined time Tm after the power supply voltage is applied to the terminal T1 at the state where the terminal T2 is connected to the ground.

Thereby, for example, when the shift lever operation of the driver passes the reverse range or when the power supply voltage V1 is supplied to the terminal T1 for only a moment by any trigger, a useless foreign matter removal operation is not performed.

Second Illustrative Embodiment of Removal Drive Device

Figure 17:
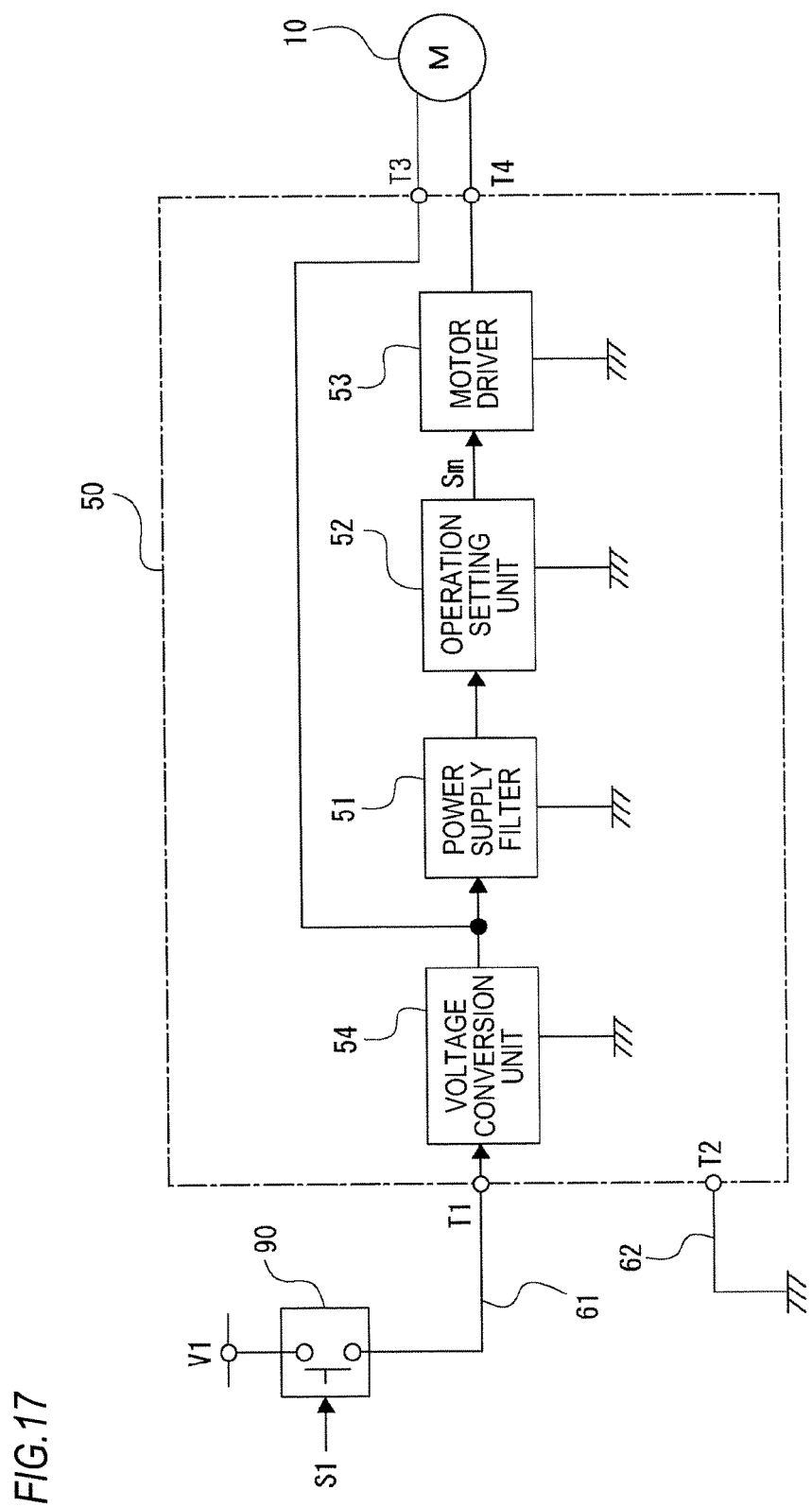
FIG. 17 is a circuit diagram of a second illustrative embodiment of the removal drive device.

A configuration of the removal drive device 50 of a second illustrative embodiment is shown in FIG. 17. The same parts as FIG. 14 are denoted with the same reference numerals, and the descriptions thereof are omitted.

In the second illustrative embodiment, a voltage conversion unit 54 is provided between the terminal T1 and the power supply filter 51 (or the terminal T3). The voltage conversion unit 54 is a well-known buck-boost DC/DC converter or the like and is configured to perform voltage conversion in accordance with a voltage to be applied to the terminal T1.

In FIG. 17, the power supply line 61 to which the terminal T1 is connected is supplied with the power supply voltage V1 via the switch 90.

In the meantime, the power supply voltage V1 may be a 24V power supply, a 6V power supply or a 12V power supply like the first illustrative embodiment, for example. For example, when the vehicle is a truck and a power supply line of a 24V battery is connected to the removal drive device 50, the power supply voltage V1 is 24V. Also, when the power supply is commonly used for the in-vehicle camera 100 and the removal drive device 50, if the in-vehicle camera 100 uses a 6V power supply, the power supply voltage V1 is 6V.

A signal S1 for turning on or off the switch 90 is a signal corresponding to a power supply system to be connected. For example, in the case of a power supply system for the in-vehicle camera 100, the signal is a signal for turning on the switch 90 at a timing at which the in-vehicle camera 100 becomes on. In addition, the signal may be a signal for turning on the switch 90 in response to the shift to the reverse range, like the first illustrative embodiment, or a signal for turning on the switch 90 by ignition-on.

Since the type of the vehicle on which the removal drive device 50 is to be mounted and the wiring specification are diverse, it is favorable if the removal drive device 50 can cope with the connections to the diverse power supply lines. Therefore, the voltage conversion unit 54 is provided, as shown in FIG. 17.

When the removal drive device 50 uses a 12V power supply, the voltage conversion unit 54 operates, as follows.

When the power supply voltage V1 to the terminal T1 is 24V, the input voltage 24V is dropped to 12V, which is then output.

When the power supply voltage V1 to the terminal T1 is 12V, the input voltage 24V is output as it is, without converting the same.

When the power supply voltage V1 to the terminal T1 is 6V, the input voltage 6V is boosted to 12V, which is then output.

Like this, the voltage conversion unit 54 operates, in accordance with the voltage value of the power supply voltage V1 applied to the terminal T1. The output voltage (for example, 12V) of the voltage conversion unit 54 is supplied to the terminal T3, which becomes a driving voltage for supplying the driving current to the motor 10 and a power supply voltage for operating the operation setting unit 52.

Like this, the voltage conversion unit 54 configured to generate the driving voltage of the motor 10 by boosting or dropping the power supply voltage V1 to be supplied to the terminal T1 is provided, so that it is possible to cope with the diverse power supply systems even though the driving voltage for the motor 10 and the configuration for drive time control of the operation setting unit 52 are designed in conformity to the specific power supply voltage of 12V, for example.

Therefore, it is possible to mount the removal drive device 50 to a variety of types of the vehicle and to increase the degree of freedom of the power supply line to be connected.

Third Illustrative Embodiment of Removal Drive Device

Figure 18A:
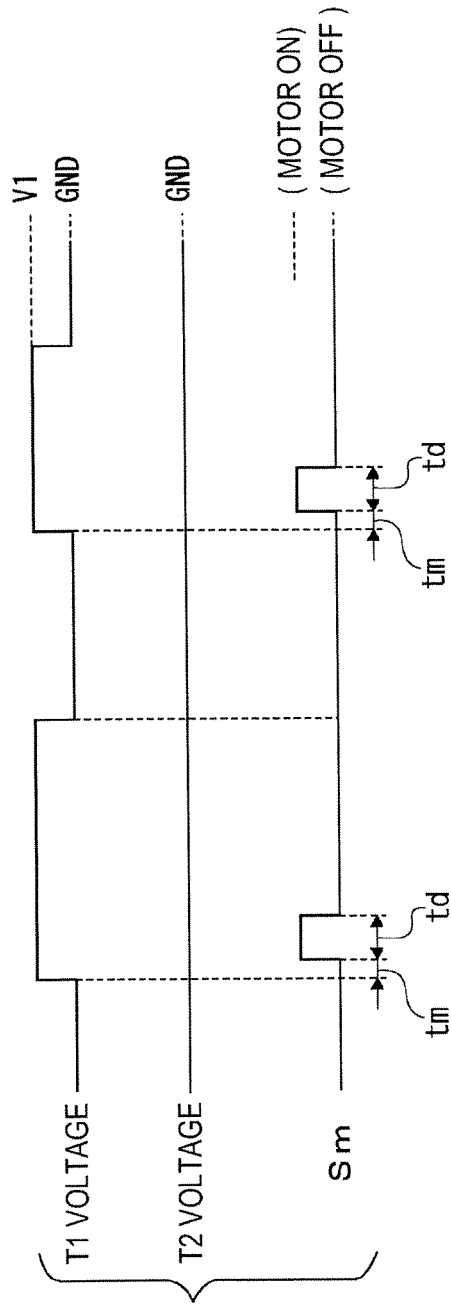
FIGS. 18A and 18B illustrate operations of a third illustrative embodiment of the removal drive device.

In the first and second illustrative embodiments, the switch 90 is provided for the power supply line 61, and when the power supply voltage V1 is supplied to the terminal T1, the motor 10 is driven. This aspect is shown in FIG. 18A.

The applying of the voltage V1 to the terminal T1 is controlled by the switch 90, and the terminal T2 is normally connected to the ground. When the voltage is applied to the terminal T1, the signal Sm becomes the H level only for the first predetermined time td after the second predetermined time tm elapses, and the motor 10 is operated for the corresponding time period.

In contrast, the motor driving operation may be performed by normally applying the voltage to the terminal T1 and controlling the connection of the terminal T2 to the ground.

Figure 19:
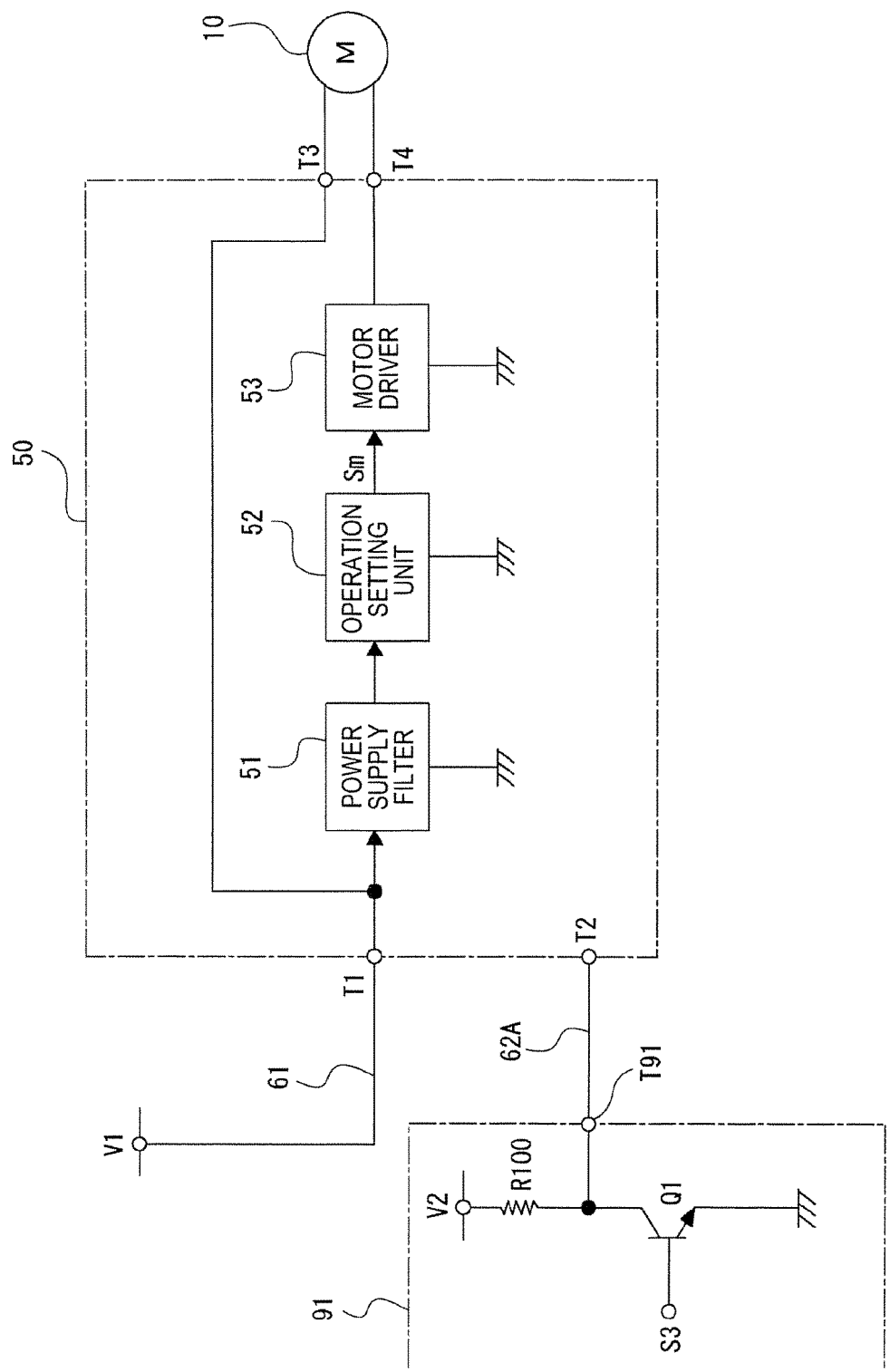
FIG. 19 is a circuit diagram of the third illustrative embodiment of the removal drive device.

FIG. 19 shows a configuration example of a third illustrative embodiment. In FIG. 19, the configuration of the removal drive device 50 is the same as the first illustrative embodiment (FIG. 14). Alternatively, the voltage conversion unit 54 may be provided, like the second illustrative embodiment (FIG. 17). In FIG. 19, the connection states of the terminals T1, T2 are different.

The terminal T1 is connected to the power supply line 61 of the power supply voltage V1. The switch 90 shown in FIG. 14 is not interposed. For example, when the power supply line 61 is an ignition-type power supply line to which a battery power supply voltage is to be supplied by ignition-on, the voltage of the terminal T1 is normally the power supply voltage V1 (the vehicle is at an ignition-on state).

Figure 18B:
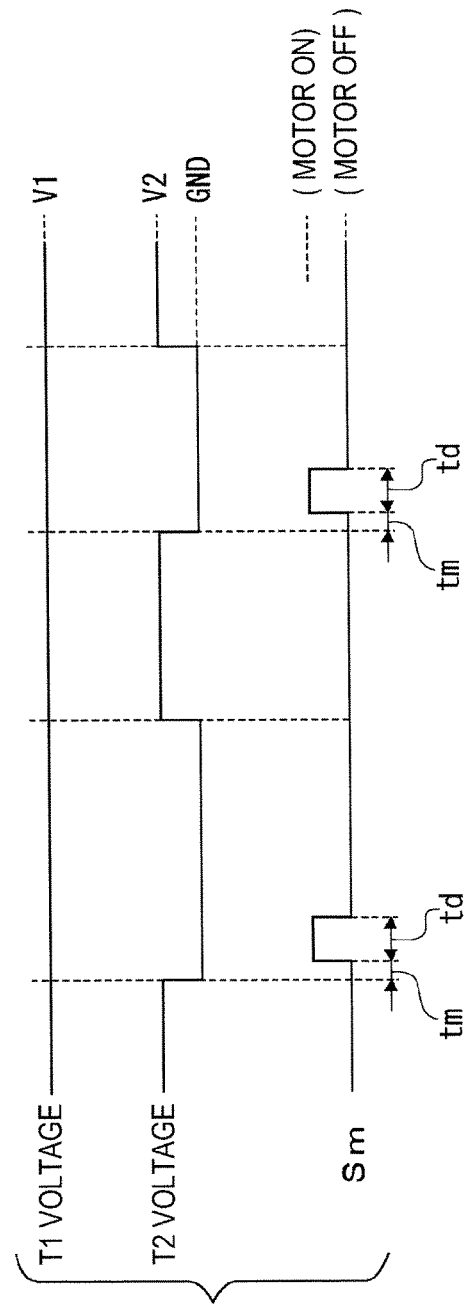

FIG. 18B depicts a state where the voltage of the terminal T1 is normally the power supply voltage V1.

On the other hand, the terminal T2 is not directly connected to the ground and is connected to a terminal T91 of the ECU 91 of the vehicle via a line 62A, for example.

In the ECU 91, for example, a resistance R100 and a collector and an emitter of a bipolar transistor serving as a switch element Q1 are connected in series between a power supply voltage V2 and the ground, and a connection point thereof is connected to the terminal T91. A base of the bipolar transistor serving as the switch element Q1 is supplied with a signal S3 for on/off control, based on control processing of the ECU 91. In the meantime, the power supply voltage V2=V1, for example.

In this case, when the switch element Q1 is off, the voltage of the terminal T2 becomes a predetermined voltage (=V2). On the other hand, when the switch element Q1 becomes on, the voltage of the terminal T2 becomes a ground potential. FIG. 18B depicts an aspect in which as the switch element Q1 becomes on and off by the signal S3, the voltage of the terminal T2 changes. That is, the terminal T2 is selectively connected to a predetermined voltage point and the ground.

As shown in FIG. 18B, the operation setting unit 52 generates the signal Sm to control the motor driver 53. The specific circuit example of the operation setting unit 52 has been described with reference to FIG. 16. In the circuit of FIG. 16, when the voltage between the power supply voltage V1 and the ground is applied between the terminals T1, T2, which is a trigger, the operation setting unit 52 sets the foreign matter removal drive time (first predetermined time Td) and start timing (after the second predetermined time Tm). That is, the voltage between the power supply voltage V1 and the ground is applied between the terminals T1, T2, the comparators A1, A2 and the peripheral circuit thereof operate, as described above.

Therefore, as the power supply voltage V1 is applied to the terminal T1 at the state where the terminal T2 is connected to the ground, the driving current is supplied to the motor driver, like the first illustrative embodiment. However, also in the case where the terminal T2 becomes the ground potential from the potential of the predetermined voltage point at a state where the power supply voltage V1 is applied to the terminal T1, the same operation is performed, as shown in FIG. 19. That is, after the second predetermined time tm elapses from a point of time at which the terminal T2 becomes the ground potential, the signal Sm becomes the H level for the first predetermined time td and the driving current is supplied to the motor 10 by the motor driver 53 for the corresponding time period (refer to the signal Sm in FIG. 18B).

Like the third illustrative embodiment, the terminal T1 may be directly connected to the power supply line 61 to which the power supply voltage V1 is to be supplied, and the terminal T2 may be selectively connected to the predetermined voltage point and the ground. In this case, when the terminal T2 becomes the ground potential from the potential of the predetermined voltage point at the state where the power supply voltage V1 is applied to the terminal T1, the operation setting unit 52 controls the motor driver 53 to supply the driving current to the motor 10.

That is, the operation of the removal drive device 50 can executed by the control at the ground line-side, too, so that it is possible to improve the degree of freedom of the power supply line wiring to the terminal T1.

For example, even when the wiring is made so that the power supply voltage V1 is normally to be supplied to the terminal T1 at predetermined conditions such as ignition-on, the terminal T2 is selectively connected to the predetermined voltage point and the ground, so that it is possible to perform the foreign matter removal operation at the appropriate timing and for the appropriate time period.

Modified Embodiments

The configurations and connection aspects of the present invention are not limited to the above illustrative embodiments, and a variety of modified embodiments are possible.

For example, in the first illustrative embodiment, when the vehicle falls within the reverse range, the power supply voltage V1 is supplied to the terminal T1. However, a case where the switch 90 becomes on at other conditions and the power supply voltage V1 is supplied to the terminal T1 is also considered.

For example, it is considered to perform the foreign matter removal when dirt is detected on the lens part 101 of the in-vehicle camera 100. For instance, the ECU 91 or image processing unit mounted on the vehicle timely analyzes a captured image of the in-vehicle camera 100. For example, it is possible to estimate a state where water droplets and dirt are attached, from a distribution, an amount, a contrast and the like of edge components on the image. When a dirtiness state is determined by the image analysis, the control of turning on the switch 90 of FIG. 14 (or turning on the switch element Q1 of FIG. 19) may be performed to execute the foreign matter removal, for example.

Also, a configuring of turning on the switch 90 (switch element Q1) in accordance with a driver's operation may be added.

Also, the example where the foreign matter removal device 1 is applied as the foreign matter removal device 1 of the in-vehicle camera 100 has been exemplified. However, the foreign matter removal device 1 can also be widely applied as a device for removing foreign matters of the respective parts provided for the vehicle, which are objects of which foreign matters are to be removed, such as a vehicle lamp, a window, a mirror, a collision prevention sensor, and the like. Therefore, the removal drive device 50 of the present invention can be applied as a device for driving a variety of the foreign matter removal devices 1. Also, it is possible to set the foreign matter removal timing, in correspondence to a place to which the foreign matter removal is to be applied.

Also, the target to which the present invention is to be applied is not particularly limited inasmuch as the target is a device to be used outdoor. For example, the present invention can be applied to a camera and other devices that are to be attached to an airplane, a train, a robot, an outdoor installation, a building and the like with being exposed outside.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A foreign matter removal device comprising:
a cylinder in which air is introduced;
a piston movably supported to the cylinder and configured to deliver the air introduced into the cylinder as high-pressure air;
a nozzle configured to inject the high-pressure air delivered by the piston towards an object to be washed;
an urging spring configured to urge the piston, and
a moving mechanism configured to move the piston to a predetermined position by applying a moving force to the piston,
wherein regarding a moving direction of the piston, a direction in which the high-pressure air is to be delivered is a delivery direction and an opposite direction to the delivery direction is a force accumulation direction,
wherein the piston is configured to move in the force accumulation direction by the moving mechanism and to move in the delivery direction by an urging force of the urging spring in response to release of the moving force applied by the moving mechanism at the predetermined position,
wherein the cylinder is provided with a piston support part configured to movably support the piston and a coupling protrusion having a delivery path, which continues to the piston support part and is configured to deliver the high-pressure air towards the nozzle,
wherein an inner surface of an end portion of the piston support part in the delivery direction is formed as a closed surface,
wherein the delivery path is located further towards the force accumulation direction than the closed surface,
wherein the moving mechanism comprises a main driving gear configured to rotate by a driving force of a motor and a driven gear configured to engage with the main driving gear and to rotate in association with rotation of the main driving gear,
wherein the driving force of the motor is to be transmitted to the piston via the main driving gear and the driven gear,
wherein a rack coupled to the piston is provided,
wherein the driven gear is provided with a pinion that is to be engaged with the rack,
wherein a gear part is provided at a part of an outer periphery of the pinion,
wherein a part of the outer periphery of the pinion where the gear part is not provided is formed as a toothless part,
wherein a plurality of the gear parts is formed with being spaced in a circumferential direction, and
wherein when an opposed surface of the piston facing the closed surface is moved in the delivery direction away from the delivery path, a space closed by the inner surface including the closed surface of the piston support part and the opposed surface of the piston is formed.

2. The foreign matter removal device according to claim 1, wherein a worm is used as the main driving gear and a worm wheel is used as the driven gear.

* * * * *